(12) United States Patent
Phillips et al.

(10) Patent No.: US 12,284,404 B2
(45) Date of Patent: Apr. 22, 2025

(54) METHODS AND DEVICES FOR HANDLING MEDIA DATA STREAMS

(71) Applicant: Telefonaktiebolaget LM Ericsson (publ), Stockholm (SE)

(72) Inventors: Chris Phillips, Hartwell, GA (US); Robert Hammond Forsman, Jr., Sugar Hill, GA (US); Sarel Cohen, Tel-Aviv (IL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 241 days.

(21) Appl. No.: 17/633,609

(22) PCT Filed: Aug. 19, 2019

(86) PCT No.: PCT/SE2019/050759
§ 371 (c)(1),
(2) Date: Feb. 8, 2022

(87) PCT Pub. No.: WO2021/034238
PCT Pub. Date: Feb. 25, 2021

(65) Prior Publication Data
US 2022/0329886 A1    Oct. 13, 2022

(51) Int. Cl.
*H04N 21/2343* (2011.01)
*H04N 19/167* (2014.01)
(Continued)

(52) U.S. Cl.
CPC ... *H04N 21/234327* (2013.01); *H04N 19/167* (2014.11); *H04N 19/597* (2014.11); *H04N 21/85406* (2013.01)

(58) Field of Classification Search
CPC ......... H04N 21/234327; H04N 19/167; H04N 19/597; H04N 21/85406; H04N 21/21805;
(Continued)

(56) References Cited

U.S. PATENT DOCUMENTS 10,356,387 B1 *   7/2019   Phillips ............... H04N 21/816
2017/0070674 A1 *  3/2017   Thurow ............... H04N 23/698
(Continued)

FOREIGN PATENT DOCUMENTS

EP    3249928 A1    11/2017
GB    2509954 A      7/2014
(Continued)

OTHER PUBLICATIONS

Communication Pursuant to Article 94(3) EPC mailed Sep. 6, 2023 for European Application No. 19941917.7, 7 pages.
(Continued)

*Primary Examiner* — Jared Walker
(74) *Attorney, Agent, or Firm* — Sage Patent Group

(57) ABSTRACT

The embodiments herein relate to a method performed by a server device for handling media data streams. The sever device obtains multiple streams of source media data of varying resolution each having multiple source frames. Each source frame is divided into a plurality of tiles. The server device selects a subset of tiles from least one of the streams of source media data. The selected subset of tiles is comprised in an output frame. The server device determines layout information for the selected subset of tiles in the output frame. The layout information comprises scale, source tile index and output tile index.

7 Claims, 23 Drawing Sheets

(51) Int. Cl.
*H04N 19/597* (2014.01)
*H04N 21/854* (2011.01)

(58) Field of Classification Search
CPC ......... H04N 21/222; H04N 21/234345; H04N 21/234363; H04N 21/23439; H04N 21/26258; H04N 21/2662; H04N 21/4728; H04N 21/6373; H04N 21/6587; H04N 21/8451; H04N 21/8456; H04N 21/816

See application file for complete search history.

(56) References Cited

U.S. PATENT DOCUMENTS

| | | |
|---|---|---|
| 2018/0035134 A1 | 2/2018 | Pang et al. |
| 2018/0197271 A1 | 7/2018 | Broadhurst et al. |
| 2019/0114830 A1* | 4/2019 | Bouazizi ................. G06F 3/013 |
| 2019/0208234 A1* | 7/2019 | Van Brandenburg ........................ H04N 21/8455 |
| 2019/0230142 A1* | 7/2019 | He .......................... H04L 65/80 |

FOREIGN PATENT DOCUMENTS

| | | |
|---|---|---|
| GB | 2527786 A | 1/2016 |
| WO | 2014057131 A1 | 4/2014 |
| WO | 2015197815 A1 | 12/2015 |
| WO | 2017060423 A1 | 4/2017 |
| WO | 2017140948 A1 | 8/2017 |
| WO | 2018011042 A1 | 1/2018 |
| WO | 2019002662 A1 | 1/2019 |
| WO | 2019073112 A1 | 4/2019 |
| WO | WO-2019073113 A1 * | 4/2019 |
| WO | 2020008106 A1 | 1/2020 |

OTHER PUBLICATIONS

Extended European Search Report for European Patent Application No. 19941917.7, mailed Jul. 25, 2022, 12 pages.

Wang, et al. "WD 3 of ISO/IEC 23090-2 OMAF 2nd edition," International Organisation for Standardisation; Coding of Moving Pictures and Audio, Oct. 2018, Macao, China, 226 pages.

International Search Report and Written Opinion of the International Searching Authority for PCT International Application No. PCT/SE2019/050759 dated Apr. 27, 2020.

* cited by examiner

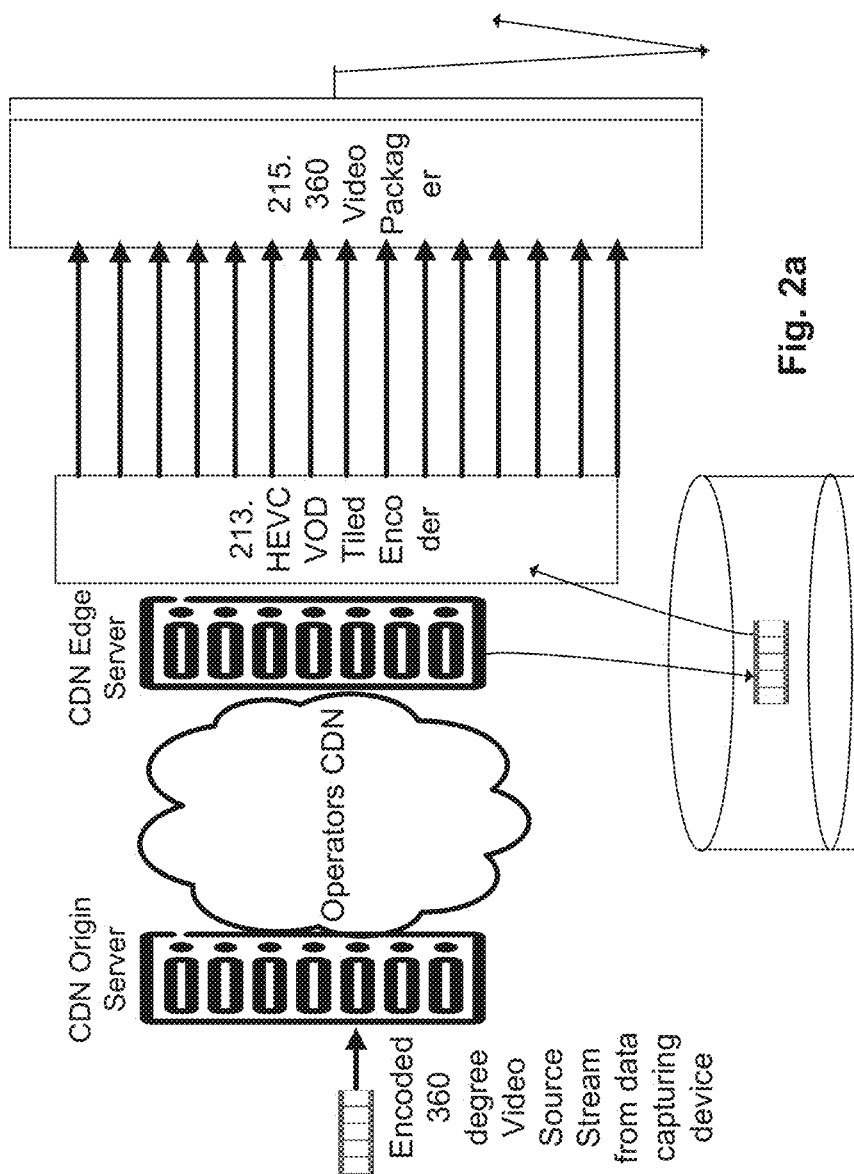

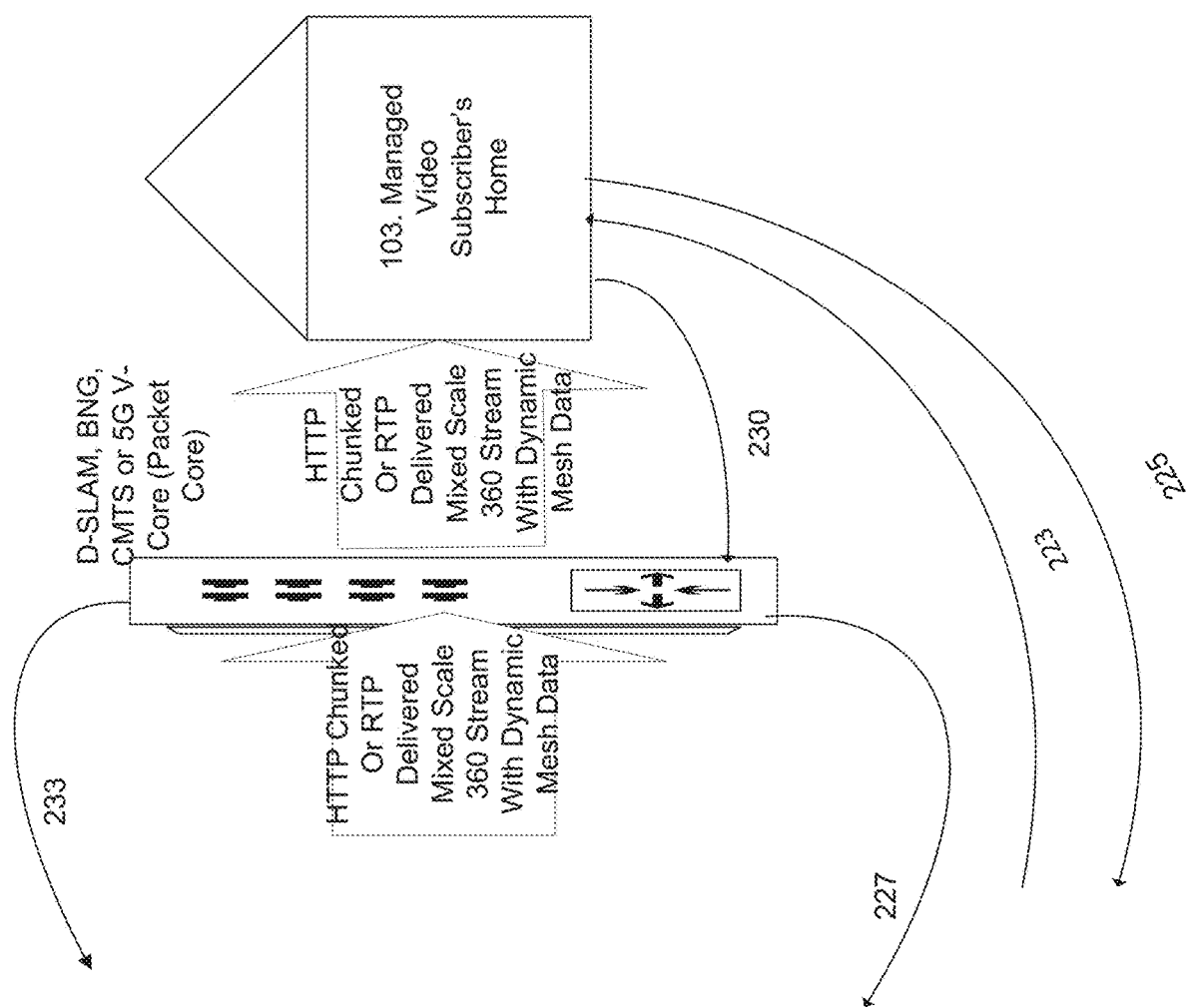

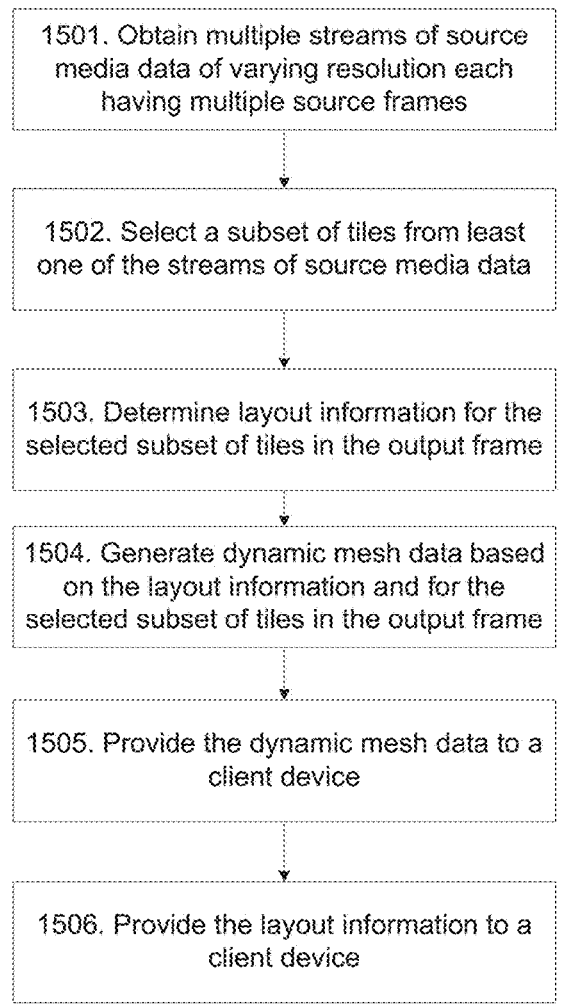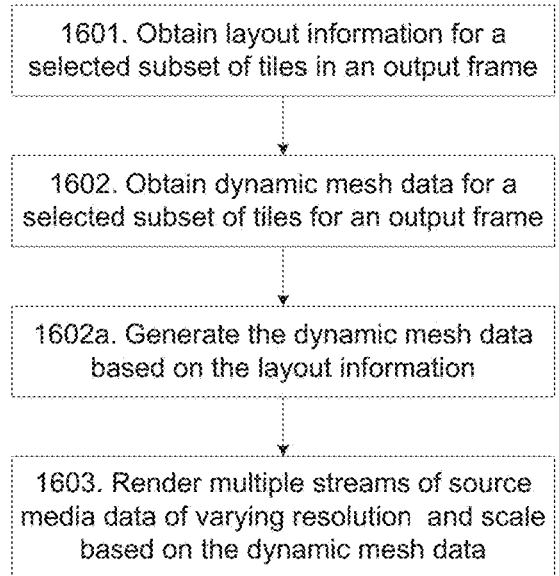
Fig. 15
Fig. 16

METHODS AND DEVICES FOR HANDLING MEDIA DATA STREAMS

CROSS REFERENCE TO RELATED APPLICATION

This application is a 35 U.S.C. § 371 national stage application of PCT International Application No. PCT/SE2019/050759 filed on Aug. 19, 2019, the disclosure and content of which is incorporated by reference herein in its entirety.

TECHNICAL FIELD

Embodiments herein relate generally to a server device, a method performed by the server device, a client device and a method performed by the client device. More particularly the embodiments herein relate to handling media data streams.

BACKGROUND

The introduction of virtual reality has brought new applications to the forefront in addition to improving several existing technologies. One improvement over existing technologies can be seen in the case of 360 degree immersive video, also variously referred to as panoramic video, 360 degree video, 360° video or 360 video, and the like.

360 degree video offers the user with an immersive "being there" experience. The increased immersion of virtual reality can easily be applied to video, providing superior user experience over the traditional video that is projected on flat surfaces. The popularity of navigable 360 degree video systems has also grown with the advent of omnidirectional capturing systems and interactive displaying systems, such as head-mounted displays (HMDs) or headsets.

Current 360 degree headsets are 2 k resolution devices covering 1 k per eye. In order to achieve the best quality in the headset, a network may for example require sending an 8K 360 degree video stream to the headset. Today this is done using standard Adaptive Bit Rate (ABR) techniques using segmented video streams and a manifest. Depending on the headset's calculation of bandwidth, it will attempt to pull a full 360 degree video segment at a given encoding rate covering a uniform quality and resolution for the full 360 degree video. As with ABR techniques, the headset will estimate the amount of bandwidth and select an appropriate encoded bit rate based on the calculation.

From the video encoding perspective, High Efficiency Video Coding (HEVC) tiled encoding exists today. The original intent was for parallel process encoding and decoding. This process allows for multiple processors to be dedicated to each of the defined tiles. An example would be encoding an 8 k video with 2×2 tiles equaling a total of 4 tiles. Each of these tiles could be assigned to its own processor for the encoding and/or decoding process.

When using traditional ABR delivery for video streams, the video stream will result in a uniform quality across the entire 360 degrees.

Several methods of providing a better Quality of Experience (QoE) using HEVC tiled delivery exist today. However, there is a need for further enhancement of these methods.

Given that headsets attempt to pull a set resolution covering the entire 360 space and the headset is a viewport into the 360 degree space, the quality of experience on the headset is severely affected by changes in the full 360 degree resolutions due to bandwidth changes. It is a significant headset quality difference between 8 k, 4 k and 1080p content. Using standard ABR techniques, this is the only option of encoding and delivering video for 360 degree headsets.

4 k and even 8 k headsets will probably be seen in the future. This will require a full 360 degree video resolution of 16 k and 32 k, respectively, to achieve the absolute best in headset quality. This comes at a huge bandwidth cost even using the latest HEVC (h.265) standards.

There are existing methods which provide a bandwidth management/QoE optimization based on the user's field of vision for 360 degree video. This is achieved by selecting varying quality HEVC tiles where the highest quality is in the direct field of vision and lowering qualities throughout areas of the peripheral vision down to the lowest quality directly opposite from the Field of Vision (FOV). These methods provide for extremely fast quality upgrades within 2-3 frames of video. These methods only work if all the 360 degree video streams various qualities are of the same resolution e.g. 8K but vary in quality and bitrate. The limitations of the methods result in how low the bitrate can go for the lower quality encodings used. This can affect bandwidth quality in the higher areas of the viewport because more bits than necessary will be dedicated to the opposite area of the direct line of site. Additionally, some headsets may not have the Graphics Processing Unit (GPU) performance to decode a full 8 k stream. It may be necessary to limit the user to see the maximum resolution the headset can decode. If the headset is only capable of decoding 1080, the 360 degree content covering the entire 360 degree space will be 1080. This results in a very poor in-headset picture quality.

Therefore, there is a need to at least mitigate or solve this issue.

SUMMARY

An objective of embodiments herein is therefore to obviate at least one of the above disadvantages and to provide improve handling of media data streams.

According to a first aspect, the object is achieved by a method performed by a server device for handling media data streams. The server device obtains multiple streams of source media data of varying resolution each having multiple source frames. Each source frame is divided into a plurality of tiles. The server device selects a subset of tiles from least one of the streams of source media data. The selected subset of tiles is comprised in an output frame. The server device determines layout information for the selected subset of tiles in the output frame. The layout information comprises scale, source tile index and output tile index.

According to a second aspect, the object is achieved by a method performed by a client device for handling media data streams. The client device obtains dynamic mesh data for a selected subset of tiles for an output frame. The client device renders multiple streams of source media data of varying resolution and scale based on the dynamic mesh data.

According to a third aspect, the object is achieved by a server device for handling media data streams. The server device is adapted to obtain multiple streams of source media data of varying resolution each having multiple source frames. Each source frame is divided into a plurality of tiles. The server device is adapted to select a subset of tiles from least one of the streams of source media data. The selected subset of tiles is comprised in an output frame. The server device is adapted to determine layout information for the selected subset of tiles in the output frame. The layout information comprises scale, source tile index and output tile index.

According to a fourth aspect, the object is achieved by a client device for handling media data streams. The client device is adapted to obtain dynamic mesh data for a selected subset of tiles for an output frame. The client device is adapted to render multiple streams of source media data of varying resolution and scale based on the dynamic mesh data.

Thanks to the layout information comprising scale, source tile index and output tile index which is used for generating the dynamic mesh data, it is possible to improve handling of media data streams, e.g. in the form of rending the source media data in an improved way at the client device.

Embodiments herein afford many advantages, of which a non-exhaustive list of examples follows:

An advantage of the embodiments herein is that they provide a better QoE for the user watching the 360 degree media data stream, e.g. a video. This allows for lower bitrate 360 HEVC tiled encodings to be generated to make up the 360 degree asset's tiled package. The result will offer a better client device quality.

Another advantage of the embodiments herein is that they provide better quality client devices, e.g. 360 degree video headsets, which do not contain the processing horsepower to decode the full 360 degree media data stream at higher resolutions. Since the frames of the source media stream are not the same resolution across the full 360 degree media data stream, the amount of the decoder's processing is reduced for decoding the mixed scale tiled frames. Client devices which do not have the processing power to decode a full 360 degree 8 k media data stream will be able to decode a media data stream with frames made up of 8 k in viewport tiles with lower resolution tiles outside the viewport. This will give the user of the client device, e.g. the headset, the quality of delivering a full 360 degree 8 k media data stream.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIGS. 2a, 2b, 2c are schematic diagrams illustrating a 360 degree HEVC tiled delivery system.

FIG. 15 is a flow chart illustrating a method performed by a server device.

FIG. 16 is a flow chart illustrating a method performed by a client device.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
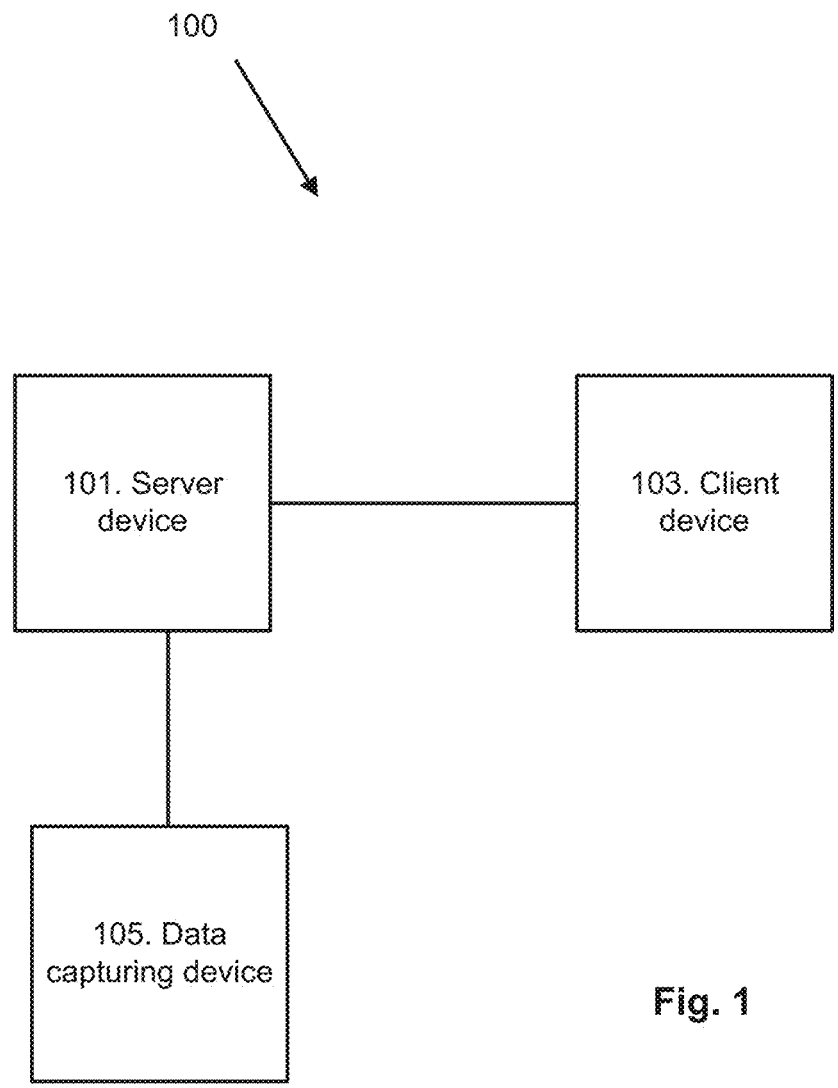
FIG. 1 is a schematic block diagram illustrating a communications system.

FIG. 1 depicts a communications system 100 in which embodiments herein may be implemented. The communication system 100 comprises a server device 101, a client device 103 and a data capturing device 105. At least some of the severer device 101, the client device 103 and the data capturing device 105 are adapted to communicate with each other directly or indirectly via some other device or unit. For example, the server device 101 and the client device 103 may be adapted to communicate with each other and the client device 103 and the data capturing device 105 may be adapted to communicate with each other. The client device 103 and the data capturing device 105 may be adapted to communicate with each other.

The server device 101 may be a computing device, a processor such as for example a Digital Signal Processor (DSP), Application Specific Integrated Circuit (ASIC) processor, Field-programmable gate array (FPGA) processor or microprocessor etc. The server device 101 may be associated with an access network serving the client device 103.

The client device 103 may be a User Equipment (UE), a 360 degree viewing device, a viewing device, a display, an interactive displaying device, a head-mounted displays, a headset etc. The client device 103 may be adapted to be viewed by a user. The client device 103 may be adapted to be worn by a user, e.g. on his head. The client device 103 may be a tethered or untethered device, standalone pieces of equipment, subscriber premises equipment, gaming equipment, and/or equipment operating in paired combination(s) with 3D display devices, etc., operating with a variety of access/connection technologies. Computers and/or displays, which may be associated with head-mounted displays (HMDs) or headsets, which may in turn also be associated with portable devices such as tablets, smartphones, phablets, gaming devices, etc., may be examples of the client device 103, may be configured to decode and render various types of 360° media data streams that may be encoded and bandwidth-optimized. Media data streams may comprise video data streams or audio data streams or both.

The data capturing device 105 may be an arrangement configured to record, generate, read, decode, provide, or otherwise obtain media data streams that are renderable for 360 degree viewing in the client device 103. The image capturing device may comprise one or more high-definition cameras (e.g., 4 k, 8 k, etc.), including omnidirectional or panoramic cameras, etc. or a video storage that may be configured to provide source media data streams in a number of ways. Depending on the configuration and level of integration with respect to video preprocessing, output streams may be provided as streams compatible with one or more interfaces, High Definition Multimedia Interface (HDMI), Serial Digital Interface (SDI), High Definition SDI (HD-SDI), or other formats, which may comprise unstitched or stitched streams, with or without projection-mapping, and with or without source video encoding. The data capturing device 105 may be configured, e.g., as a global headend, to accept media content from live sources and/or static file sources, e.g., online content providers such as Hulu, Netflix, YouTube, or Amazon Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Delivery of the media data streams to the client device 103 may be effectuated based on a number of protocols, e.g., HTTP/S, chunked HTTP/S, RTP/RTCP, etc., over a variety of network infrastructures.

It should be noted that the communication links in the communications system 100 may be of any suitable kind including either a wired or wireless link. The link may use any suitable protocol depending on type and level of layer, e.g. as indicated by the Open Systems Interconnection (OSI) model, as understood by the person skilled in the art.

The server device 101, the client device 103 and the data capturing device 105 may be located at the same or different locations. Some of the server device 101, the client device 103 and the data capturing device 105 may be co-located. For example, the server device 101 may be co-located with the data capturing device 105, the server device 101 may be co-located with the client device 103 etc.

The communications system 100 may be implemented in a hierarchical network architecture, with various aspects of media capture and preparation, as well as distributing/uploading and edge node processes taking place in different network portions disposed at different hierarchical levels, involving one or more operators, content delivery networks (CDNs), edge networks, and the like. At least some of the source device 101, the client device 103 and the image capturing device 105 may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

Figure 2B:
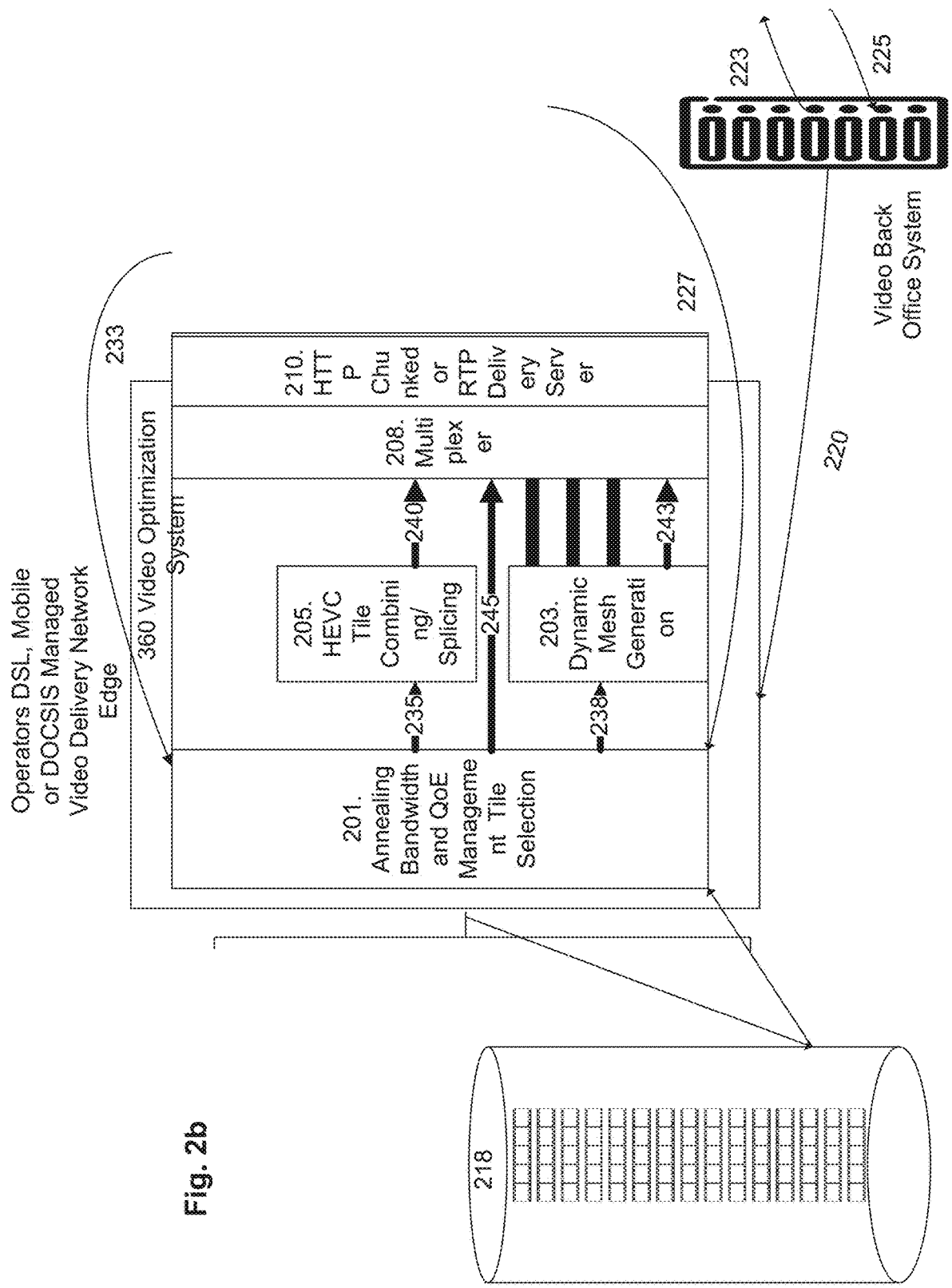

FIGS. 2a, 2b, 2c are schematic diagram illustrating a 360 degree HEVC tiled delivery system supporting tile selection from multiple 360 degree media data streams with different full 360 degree resolutions. Using other words, FIGS. 2a, 2b and 2c illustrates managed 360 degree optimized video delivery system with multi-scale resolutions. FIG. 2b is a continuation of FIG. 2a, and FIG. 2c is a continuation of FIG. 2a.

For the client device 103 to properly render the 360 degree media data stream, e.g. the source media data stream, which are dynamically made up from a mixture of tiles taken from different full 360 degree media data streams, the server device 101 may inform the client device 101 with information on how to properly render the frames. This information is called dynamic mesh data. The dynamic mesh data is coordinate information and table of quad indices. This is represented as spatial coordinates (x,y,z) and texture coordinates (u,v) and a table of quads which will be defined later herein.

FIGS. 2a, 2b, and 2c show an HEVC VOD Tiled Encoder 213 which provides parameters to a 360 Video Packager 215. FIG. 2 shows an ABR 1 second segment Full 360 HEVC Tiled Encodings Example 128 Tiles. The input parameters may be at least one of the following:

360 100 Mbs 8K Tiles
360 80 Mbs 8K Tiles
360 60 Mbs 8K Tiles
360 40 Mbs 4K Tiles
360 30 Mbs 4K Tiles
360 20 Mbs 4K Tiles
360 15 Mbs 2K Tiles
360 11 Mbs 2K Tiles
360 9 Mbs 2K Tiles
360 6 Mbs 1080p Tiles
360 4.5 Mbs 1080p Tiles
360 3.8 Mbs 1080p Tiles
360 2.5 Mbs 720p Tiles
360 1.8 Mbs 720p Tiles
360 1.2 Mbs 720p Tiles The server device 101, e.g. the annealing bandwidth and QoE management tile selection system 201 comprised in the server device 101, generates a set of tiles which make of a frame based on bandwidth and user gaze. In existing methods, only tiles from the same encoded video resolutions were selected. The tiles which make up a full 360 degree video frame now vary in terms of size and resolution based on which full 360 degree video frame the tiles were selected from. However, the embodiments herein address mixed scale tiled encodings. Herein, the annealing bandwidth and QoE management tile selection system 201 has been modified to also output layout information (at least one of e.g. scale, source tile index and output tile index) for every tile making up the set of tiles selected for the video frame to deliver to the client device 103. The tiles for the frame are fed into the HEVC tile combining/splicing subsystem. At the same time, the layout information is fed into the dynamic mesh generation subsystem 203. The HEVC tile combining subsystem 205 will output a video frame composed from the selected tiles. The dynamic mesh generation subsystem 203 generates the dynamic mesh data (x,y,z), (u,v) and the table of quads for the tiled video frame. A video frame comprises an array of tiles.

The generated dynamic mesh data along with the tiled video frame is sent to the multiplexer 208 to be muxed into the stream. The dynamic mesh data may be either Supplemental Enhancement Information (SEI) messages for MP2TS containers or MP4 box data for MP4 containers, or delivered on a side channel. MP2TS is short for MPEG-2 Transport Stream, and MPEG-2 is short for Motion Picture Experts Group 2. MP4 is short for MPEG-4, and MPEG-4 is short for Motion Picture Experts Group 4. The dynamic mesh data may be carried on a separate channel with timing information.

The dynamic mesh generation may be performed by the client device 103. This will be described below. In this case, the layout information described above may be muxed into the stream as SEI data or MP4 box and sent from the server device 101 to the client device 103. The client device 103 may generate the (x,y,z), (u,v) and the table of quads for the tiled video frame.

The layout info may be delivered directly to the client device 103, and the client device 103 may generate dynamic mesh data. If not, the layout info may be delivered to the dynamic mesh generation system comprised in the server device 101 where the server device 101 generates dynamic mesh data.

At least one of the annealing bandwidth and QoE management tile selection system 201, the dynamic mesh generation subsystem 203, the HEVC tile combining subsystem 205 and the multiplexer 208, the HTTP chunked or RTP delivery system 210 may be comprised in the server device 101. When any of these entities are described as performing a method or a method step, it is implicitly the server device 101 that performs the method or method step even though it may not be explicitly mentioned in this way.

The dynamic mesh generation subsystem 203 may be comprised in the server device 101 or the client device 103.

Dynamic Mesh Data=(Spatial Coordinates—(x,y,z), Texture Coordinates (u,v), PTS, and table of quad indices.).

The layout info comprises tile index, scale, src ERP column and src ERP row. For more details regarding the layout info, see the table in FIGS. 9a and 9b.

Figure 3:
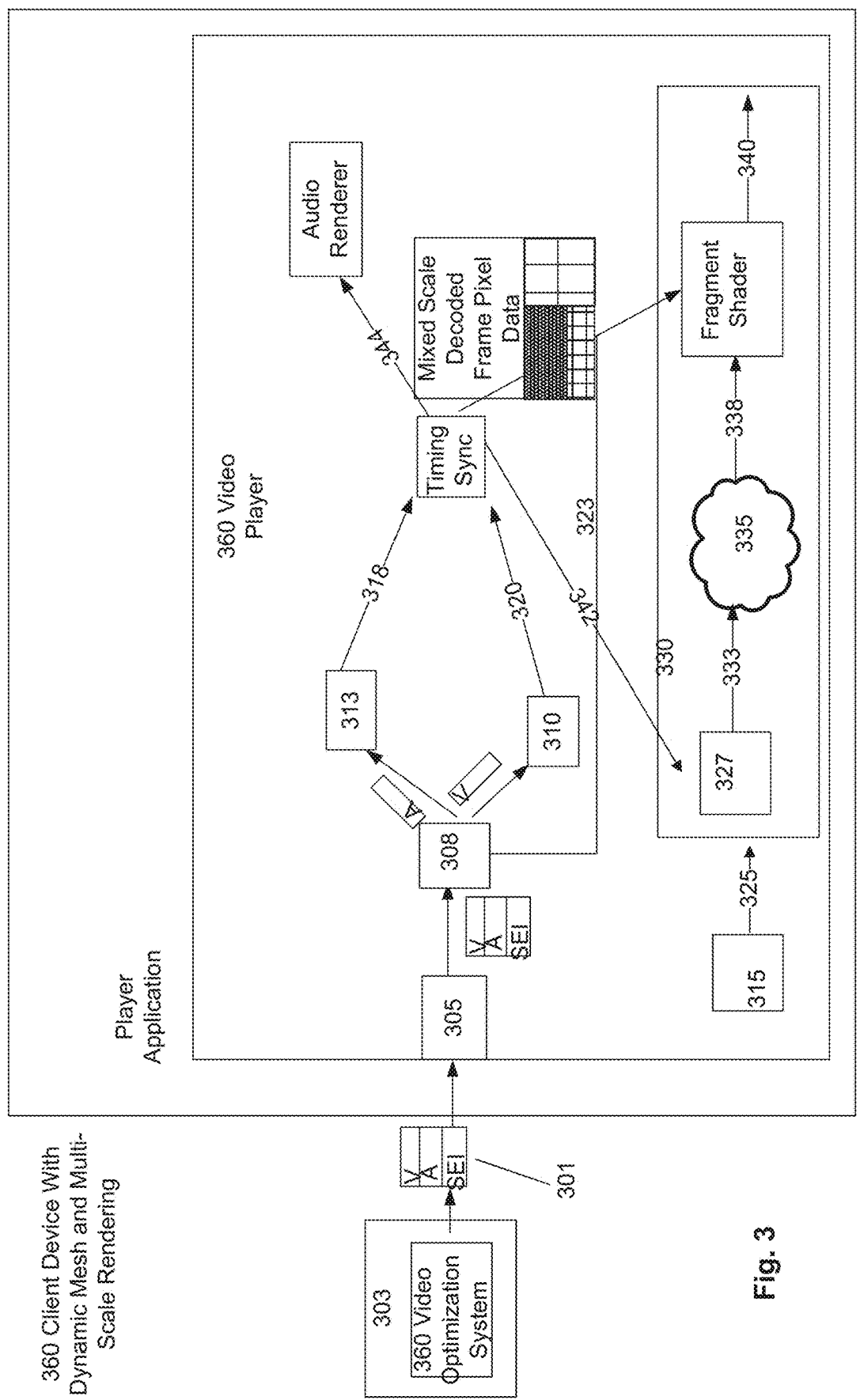
FIG. 3 is a schematic diagram illustrating a client device.

Manifest describing tiled grouping 218 shown in FIG. 2b comprises at least one of the following:
  360 100 Mbs 8K Tiles
  360 80 Mbs 8K Tiles
  360 60 Mbs 8K Tiles
  360 40 Mbs 4K Tiles
  360 30 Mbs 4K Tiles
  360 20 Mbs 4K Tiles
  360 15 Mbs 2K Tiles
  360 11 Mbs 2K Tiles
  360 9 Mbs 2K Tiles
  360 6 Mbs 1080p Tiles
  360 4.5 Mbs 1080p Tiles
  360 3.8 Mbs 1080p Tiles
  360 2.5 Mbs 720p Tiles
  360 1.8 Mbs 720p Tiles
  360 1.2 Mbs 720p Tiles The following steps, information or messages are shown in FIGS. 2a, 2b, and 2c, which may be performed in any suitable order than described below:
  220: A request for 360 degree Video Delivery System with asset Manifest and session ID
  223: Request 360 Video Session URL with Session id
  225: Request 360 Video Session
  227: User's 360 degree Gaze Coordinates with session id
  230: User's 360 Gaze Coordinates with session id
  233: Dynamic Bandwidth Allocation For 360 Video Session with Session ID
  235: Selected Tiles 360 Video Frame
  238: Layout Info
  240: Mixed Scale Tiled Frame
  243: Dynamic Mesg Data
  245: Layout Info FIG. 3 is a schematic drawing of the client device 103 which depends on the server device 101 to deliver the dynamic mesh data to support the proper rendering of the mixed scale 360 degree video frame. It expands the components inside the video renderer required for the proper rendering of the frame made up of the mixed scale tiles.

Initially the media muxed stream enters the client device 103 and may be stored in a buffer/cache, e.g. a small buffer/cache. For minimal latency this may be <=3 frames for the maximum in QoE low latency upgrades. The media cache is fed into the demultiplexer where the video data, audio data and mesh data are extracted from the container along with the presentation timestamp values. The audio data is fed to the audio decoder, video to the video decoder and the mesh data texture coordinates— (PTS; spatial coordinates: x,y,z; texture coordinates: u,v and table of quad indices) is fed to the timing sync. The timing sync contains a small buffer and holds the mesh data (PTS, and spatial coordinates: x,y,z and texture coordinates u,v until the decoded audio and video frames arrive. When it is time to present/render the media content, the timing sync sends the uncompressed audio data to the audio renderer. It sends the mixed scale decoded frame pixel data to the image renderer along with the dynamic mesh data spatial coordinates (x,y,z) and texture coordinates (u,v). For the mixed scale rendering, 4 components required to properly render the mixed scale image on screen will be discussed. The 3D engine sends the vertex shader the model view projection data. The vertex shader also receives the dynamic mesh data spatial coordinates (x,y,z) and texture coordinates (u, v). The output will be a vertex texture coordinate which will be feed into the interpolation rasterization component. This will produce an interpolated texture coordinate which will be fed into the fragment shader. The fragment shader will generate the viewport pixel data which is presented to the user on the viewport device (monitor or VR headset).

SEI or Box in FIG. 3 may be dynamic Mesh Data (Spatial Coordinates—(x,y,z), Texture Coordinates (u,v), PTS, and table of quad indices.)

FIG. 3 shows the following entities:
  Network Edge 303
  Media cache 305
  Demultiplexer 308
  Video decoder 310
  Audio decoder 313
  3D Engine 315
  Decoded Audio and Time Windows (PTS) 318
  Decoded Video Frame with time windows (PTS) 320
  Dynamic Mesh Data—x,y,z and uv with PTS 323
  Model View Projection Data 325
  Vertex Shader, tc=uv, 327
  Image Renderer 330
  Vertex Texture Coordinate 333
  Interpolation
  Rasterization 335
  Interpolated Texture Coordinate 338
  Viewport Pixel Data 340
  Dynamic Mesh Data—x,y,z and uv 342
  Decoded Audio frames 344

Figure 4:
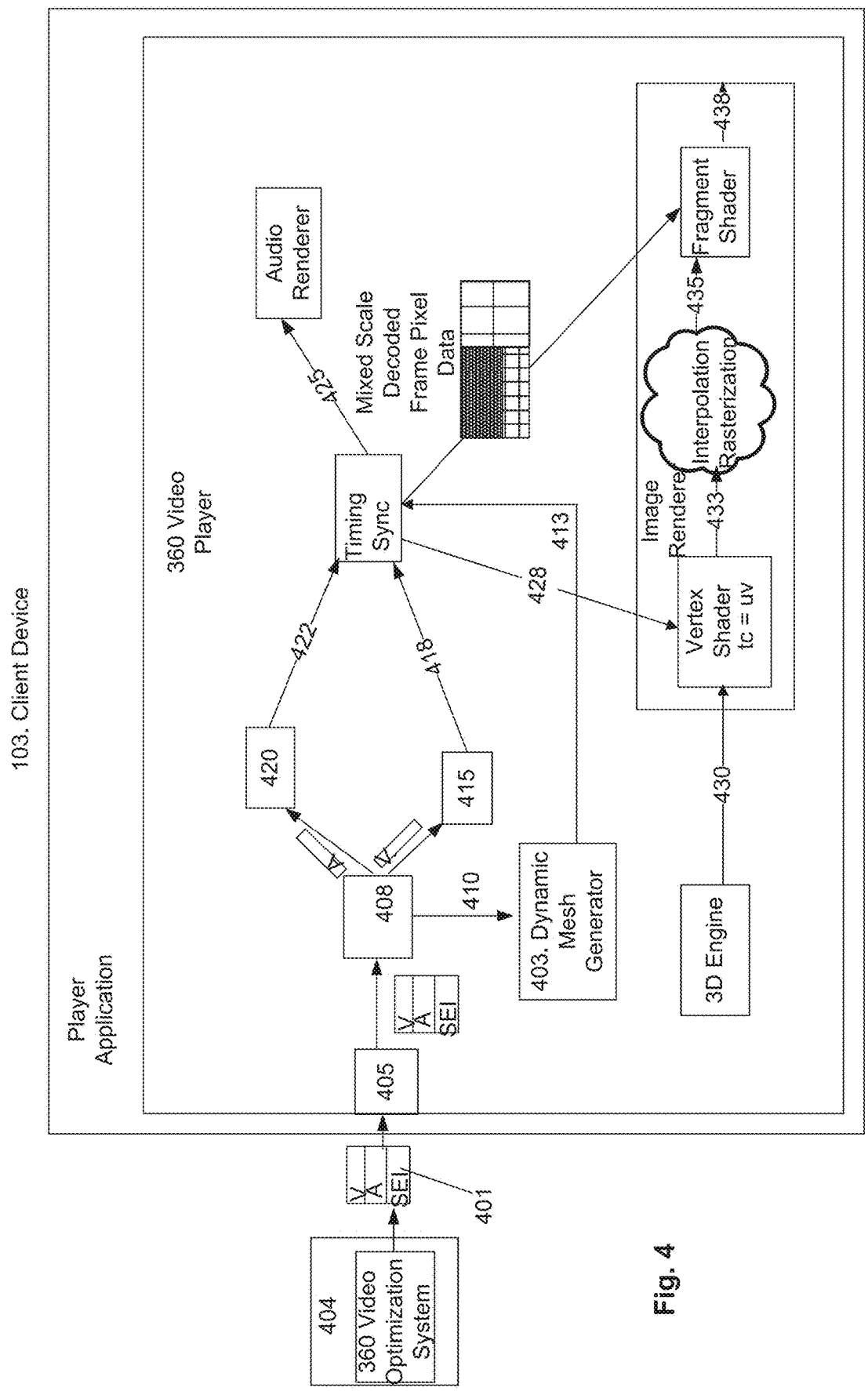
FIG. 4 is a schematic diagram illustrating a client device.

FIG. 4 is a schematic drawing of the client device 103 which may generate its own dynamic mesh data to support the proper rendering of the mixed scale 360 degree video frame. In this case, the client device 103 receives the layout info muxed into the stream as SEI messages for MP2TS containers or Box data for MP4 containers, from the server device 101, or on a separate channel with timing information. FIG. 4 illustrates 360 degree client device with dynamic mesh and multi-scale rendering. SEI or box may be Layout Info from FIG. 8a and FIG. 8b: Scale, source tile index and output tile index for every tile in the To-Render frame.

The following entities and/or information and/or data are illustrated in FIG. 4:
  Dynamic Mesh Generator 403
  Network Edge 404
  media cache 405

Demultiplexer 408
Layout Info 410
Dynamic Mesh Data—x,y,z and uv with PTS 413
Video decoder 415
Decoded Video Frame with time windows (PTS) 418
Audio Decoder 420
Decoded Audio and Time Windows (PTS) 422
Decoded Audio frames 425
Dynamic Mesh Data—x,y,z and uv 428
Model View Projection Data 430
Vertex Texture Coordinate 433
Interpolated Texture Coordinate 435
Viewport Pixel Data 438

Figure 5:
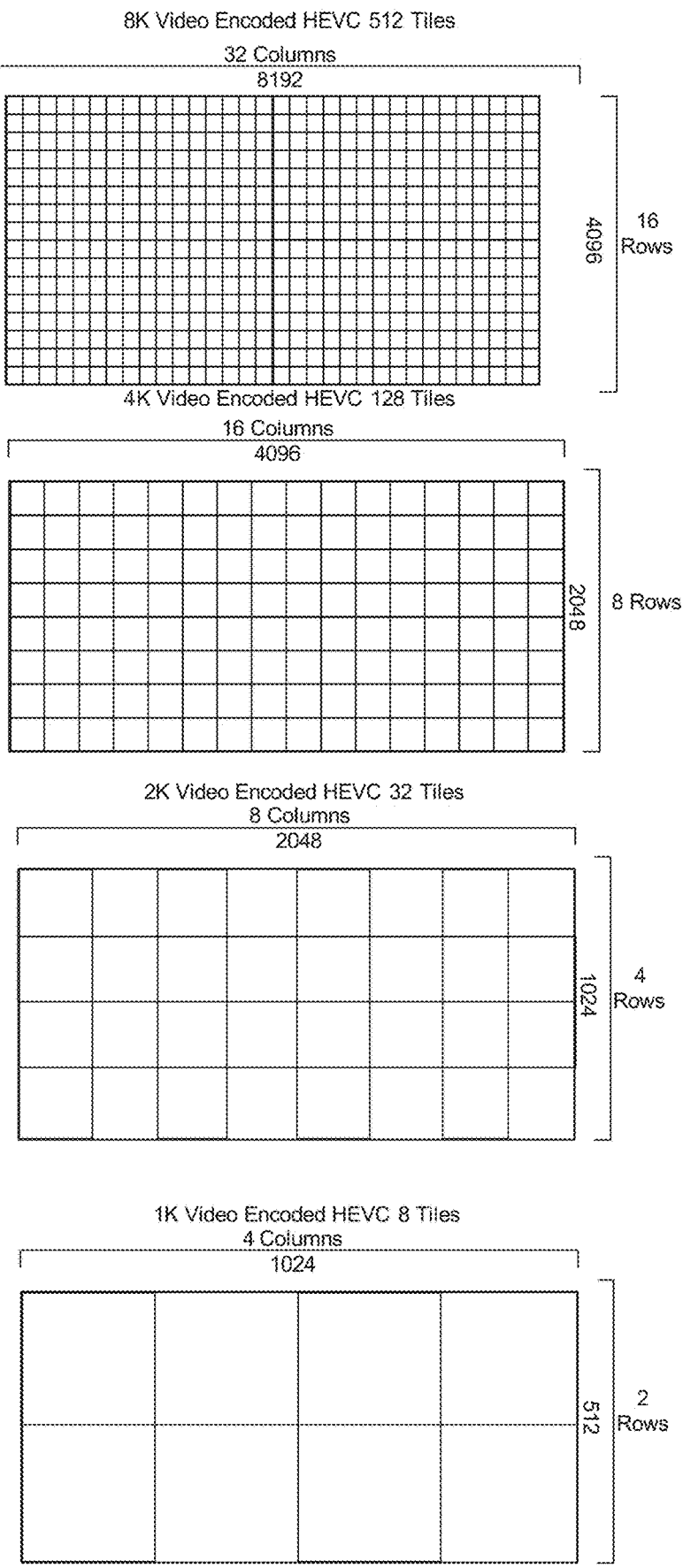
FIG. 5 is a schematic diagram illustrating an encoded frame.
Figure 6:
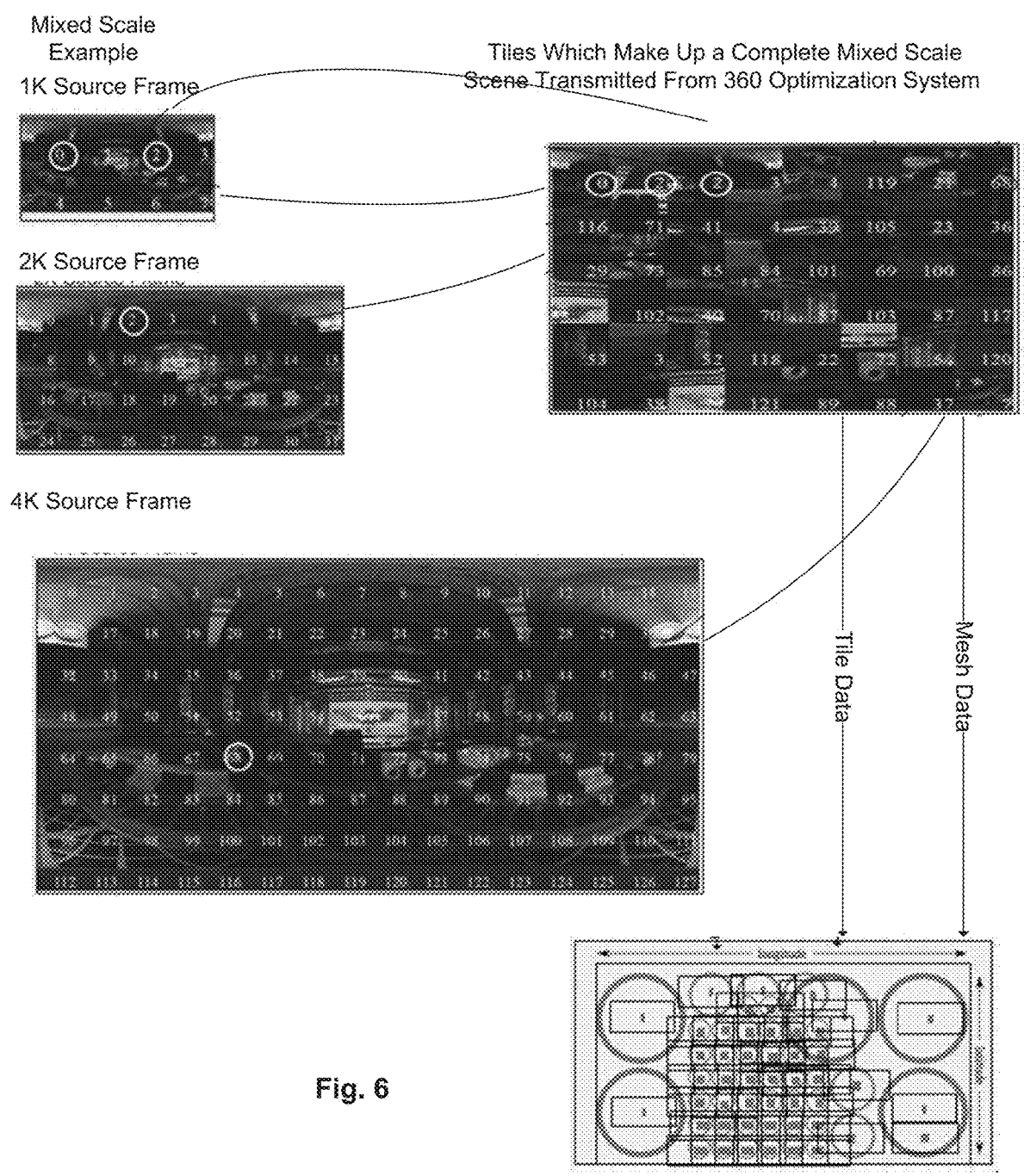
FIG. 6 is a schematic diagram illustrating a 360 degree optimization system.

FIG. 5 shows an encoded frame made up of tiles across multiple resolutions, i.e. a tiled encoded frame. It shows examples of a Multi-Resolution 360 degree HEVC Tiled Frame. All operate on resolutions and columns and grids based on powers of 2. Assuming the lowest resolution is 1 k and the highest resolution is 4 k, the encodings which makeup of the source full 360 degree streams supporting multi resolution tile selection may be as follows:

8 k—resolution of 8192×4096 with 32×16 tiles
   4 k—resolution of 4096×2048 with 16×8 tiles
   2 k—resolution of 2048×1024 with 8×4 tiles
   1 k—resolution of 1024×512 with 4×2 tiles FIG. 6 shows a 360 degree optimization system with 3 resolution source 360 stream's frames. There is a source frame from the 1 k HEVC tile encoded stream, a source frame from a 2 k HEVC tile encoded stream and a source frame from a 4 k HEVC tile encoded stream. It demonstrates the data output of the annealing bandwidth and QoE management tile selection based on the user's gaze and the bandwidth allocated. The spatial coordinates (x,y,z) and texture coordinates (u,v) which were generated for the mixed scale frame's tiles will allow the client device 103 to reassemble the frame to appear properly on the client device 103 in the 3D scene.

The embodiments herein work with an equirectangular projection 360 degree video. For a cube map or fish-eye implementation, slight modifications may need to be made in the formulas.

The bottom right box in FIG. 6 represents a position where the tiles should appear in the equirectangular scene after spatial and texture information is applied on the client device 103.

The following are examples of spatial and texture coordinates:

| Spatial Coordinates | Texture Coordinates |
| --- | --- |
| −0.1464, −0.3536, 0.9239) | (0.062, 0.083) |
| (−0.0000, −0.0000, 1.0000) | (0.062, 0.000) |
| (−0.0000, −0.0000, 1.0000) | (0.083, 0.000) |
| (−0.0000, −0.0000, 1.0000) | 0.104, 0.000) |
| (−0.0000, −0.0000, 1.0000) | (0.125, 0.000) |
| (−0.0500, −0.1206, 0.9914) | (0.062, 0.028) |
| (−0.0653, −0.1130, 0.9914) | (0.083, 0.028) |
| (−0.0795, −0.1036, 0.9914) | (0.104, 0.028) |
| (−0.0923, −0.0923, 0.9914) | (0.125, 0.028) |
| (−0.0990, −0.2391, 0.9659) | (0.062, 0.056) |
| (−0.1294, −0.2241, 0.9659) | (0.083, 0.056) |
| . | |
| . | |
| . | |
| (0.0000, −0.0000, −1.0000) | 1.000, 1.000) |

Figure 7:
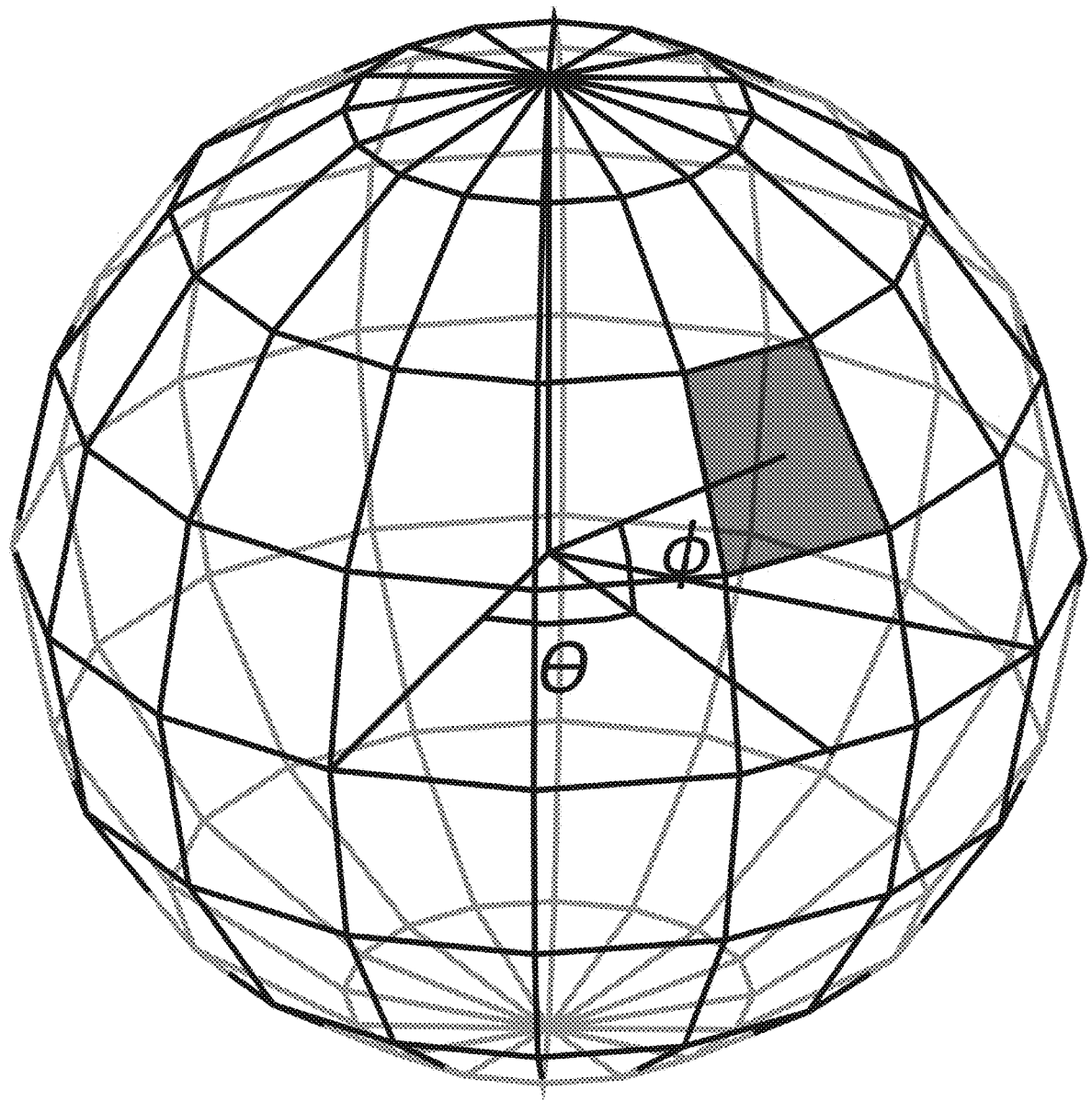
FIG. 7 is schematic diagram illustrating a UV sphere formula.

FIG. 7 is a schematic diagram showing the existing UV sphere formula/method used to render equirectangular format 360 degree. The client device 103 creates a set of triangles or quads along latitude longitude lines. Each triangle has spatial coordinates (x, y, z) and texture coordinates (u,v). The spatial coordinates are used to compute the position of the triangle relative to the data capturing device 105 and determine its location inside the viewport. The texture coordinates are used to determine which pixels from the video texture are used to paint the triangle. If all video is the same resolution, this is static for the entire 360 space.

For a normal equirectangular projection the formula is straightforward.

$$\theta = 2\pi u$$

$$\phi = \pi(v - \tfrac{1}{2})$$

$$r = \cos \phi$$

$$x = r \sin \theta$$

$$y = \sin \phi$$

$$z = r \cos \theta$$

To use the formula, compute a series of $n_r \times n_c$ quads each with corners $(u_i, v_j)$, $(u_{i+1}, v_j)$, $(u_{i+1}, v_{j+1})$, and $(u_i, v_{j+1})$ where i ranges over $0 \ldots n_{c-1}$. To calculate a specific $u_i$ and $v_j$ simply calculate $u_i = i/n_c$ and $v_j = j/n_r$.

The number of quads in the rendering geometry does not have to be related to the number of tiles in the HEVC texture.

Figure 8A:
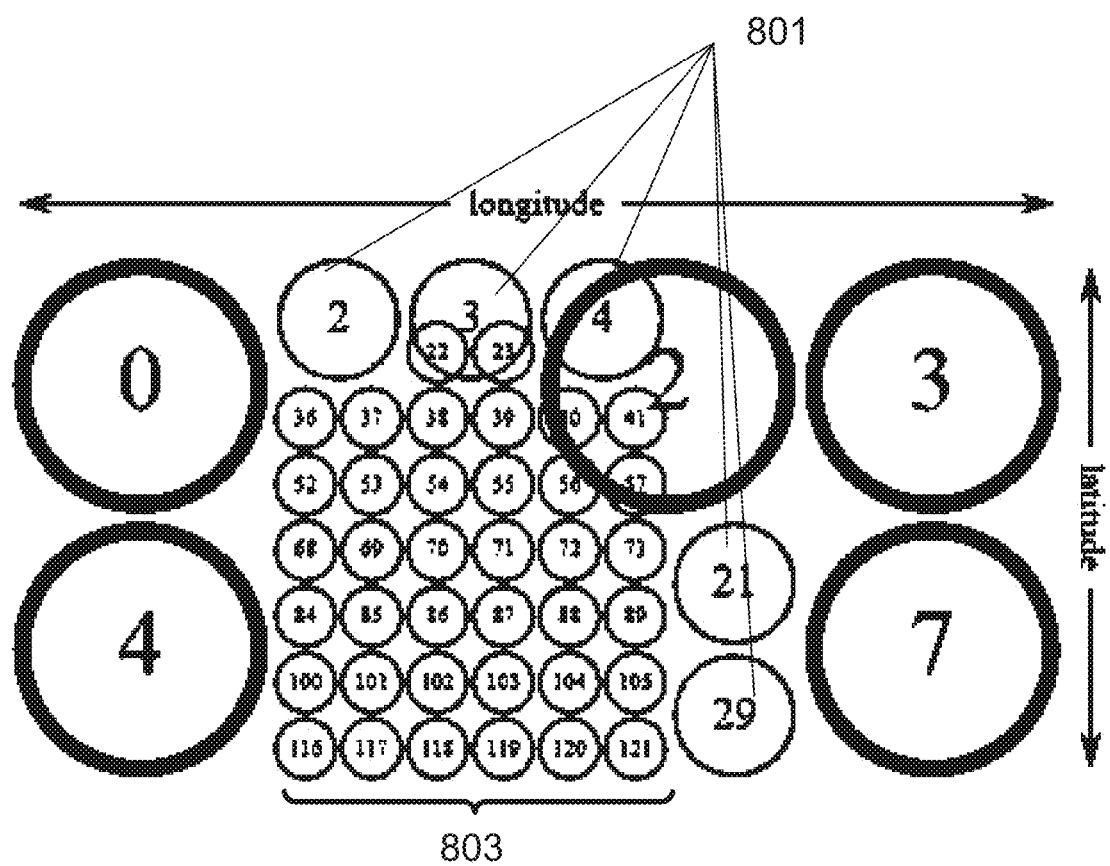
FIGS. 8a, 8b are schematic diagrams illustrating rendering a 360 degree equirectangular projection multiscale video using a dynamic mesh.
Figure 8B:
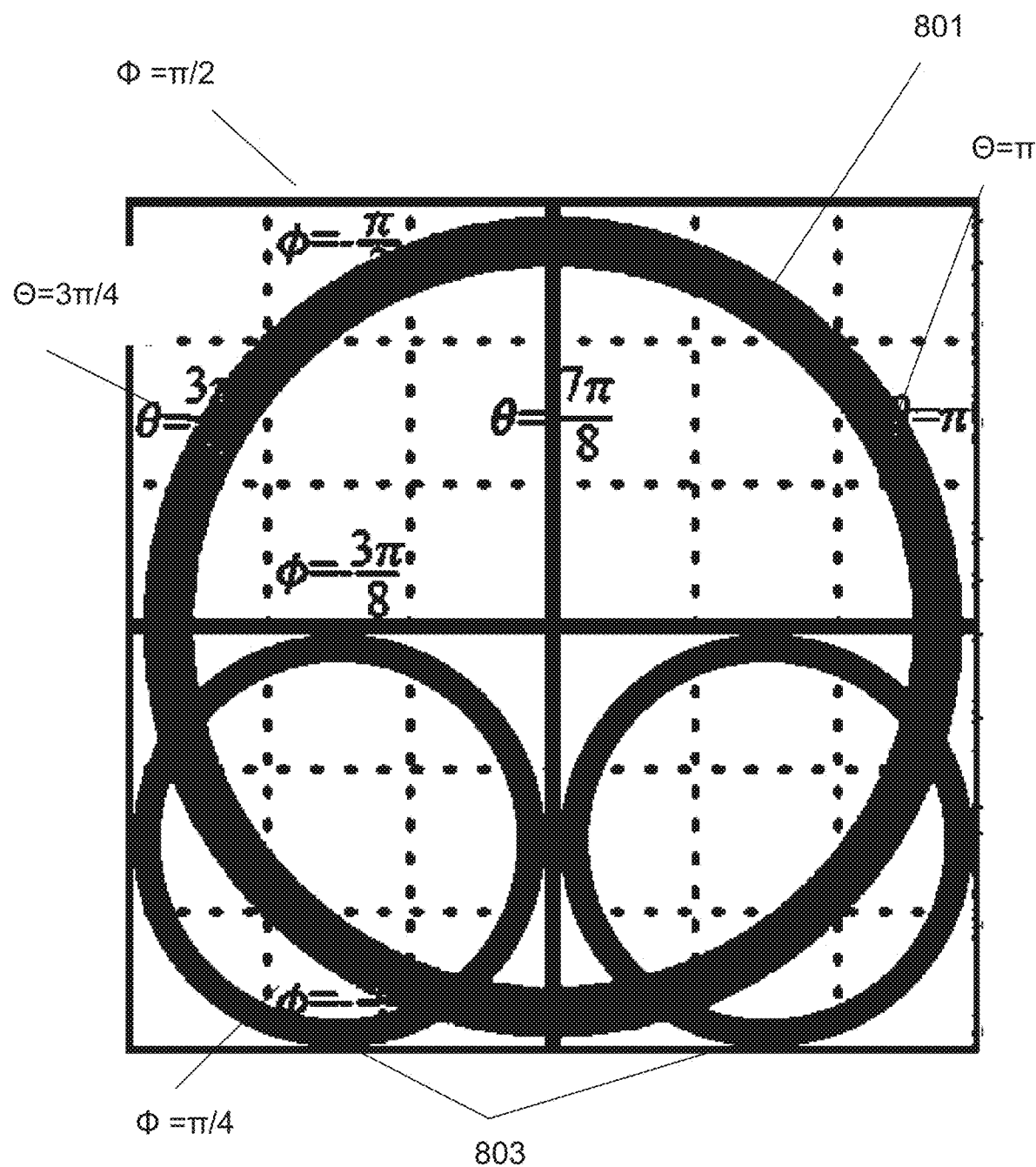

FIG. 8a and FIG. 8b are schematic diagrams illustrating a method for correctly rendering a 360 degree equirectangular projection multiscale video using a dynamic mesh. In other words, it illustrates dynamic mesh mixed scale formulas. It applies the concept of quads and metaquads. A metaquad may be defined as the size of the highest resolution tile. Lower resolution tiles will be made up of multiple metaquads. If the highest quality tile available in the source tiled content is an 8 k video, that tile would cover 1 metaquad. Therefore, the 4 k tile would cover 4 metaquads and the 2 k tile would cover 16 metaquads. The number of quads in a metaquad can be arbitrary. 9 quads per metaquad are used herein.

Tiles 3, 22 and 23 from the diagram at the top are reproduced in the diagram at the bottom. The circles with reference number 801 indicates a medium-scale tile selected from a mid resolution full 360 degree video encoding. The circles with reference numbers 803 are a fine-scale tile which provides taken from the high resolution 350 encoding and are a higher resolution version of its subsection of the image. The solid line squares are defined meta-quads, and the squares defined by the dashed lines are quads for the rendering system.

A metaquad in a mixed-scale encoded video is a rectangle from the theoretical equirectangular projection that is the same size as a tile from the finest-scale/highest resolution encoding. In the 3-scale encoding example from FIG. 5 above, a tile from the fine-scale encoding is 1 metaquad. A tile from the medium-scale encoding may cover 4 metaquads. A tile from the coarse-scale encoding may cover 16 metaquads. If there were more scales the tile to metaquad ratio would be 1:2 2s, where s is the scale index with s=0 being the finest scale and increasing with coarser scales. Metaquads are decomposed into a grid of smaller quads to reduce the impact of polar distortion.

The diagram at the top includes θ and φ coordinates for the solid lines which may be used to convert spherical coordinates to cartesian (x,y,z) coordinates using the formulas from FIG. 6. Because the mixed-scale encoding does not have a fixed relationship between texture (u,v) coordinates and spatial coordinates, the layout of the multiscale image may be known which may be transmitted on a side channel, such as an SEI or special box in an MP4 container, on a side channel or multiplexed into the transport stream as an SEI message or special box for MP4 containers.

To compute the θ and φ for a tile the following may be needed to be known:
- the row and column of the tile in its original encoding (r and c)
- the number of rows and columns in the original encoding ($n_{rs}$ and $n_{cs}$).
- the scale of the tile's original encoding (s; s=0 is the finest scale)

on the top because they both are from the same medium-scale tile. However, the two metaquads on the bottom are discontinuous at the boundary between each other and the upper two metaquads. The reason is the tiles which supply their pixels are from spatially distinct parts of the mixed scale stream.

Also note that the bottom two metaquads may pull their pixels from the medium-scale tile represented by the circle with reference number 801. However, the fine-scale tiles represented by the circles with reference number 803 provide a higher quality picture and are used instead.

Below is a table showing information that may be used to calculate θ, φ, u, and v coordinates for all the quads:

| Tile index | Col | Row | $u_i$ | $u_{i+1}$ | $v_j$ | $v_{j+1}$ | Scale | src ERP col | src ERP row | $\theta_c$ |
|---|---|---|---|---|---|---|---|---|---|---|
| 33 | 1 | 4 | $u_1 = 1/8$ | $u_2 = 2/8$ | $v_4 = 4/6$ | $v_5 = 4/6$ | 1 | 3 | 0 | $\theta_3 = 2\pi 3/8$ |
| 36 | 4 | 4 | $u_4 = 4/8$ | $u_5 = 5/8$ | $v_4 = 4/6$ | $v_4 = 5/6$ | 0 | 6 | 1 | $\theta_6 = 2\pi 6/16$ |
| 14 | 5 | 4 | $u_6 = 6/8$ | $U_7 = 7/8$ | $v_1 = 1/6$ | $v_2 = 2/6$ | 0 | 7 | 1 | $\theta_7 = 2\pi 7/16$ |

The following formulas may be used to calculate the θ and φ for the corners of tiles:

$$n_{rs} = \frac{n_{r0}}{2^s}$$

$$n_{cs} = \frac{n_{c0}}{2^s}$$

$$\theta_c = 2\pi \frac{c}{n_{cs}}$$

$$\phi_r = \pi\left(\frac{r}{n_{rs}} - \frac{1}{2}\right)$$

$$\theta_{c,i} = \left(1 - \frac{i}{2^s}\right)\theta_c + \frac{1}{2^s}\theta_{c+1}$$

$$\phi_{r,i} = \left(1 - \frac{i}{2^s}\right)\phi_r + \frac{1}{2^s}\phi_{r+1}$$

| $\theta_{c+1}$ | $\Phi_r$ | $\Phi_{r+1}$ |
|---|---|---|
| $\theta_4 = 2\pi 4/8$ | $\Phi_0 = \pi(0/4-1/2)$ | $\Phi_1 = \pi(1/4-1/2)$ |
| $\theta_7 = 2\pi 7/16$ | $\Phi_1 = \pi(1/8-1/2)$ | $\Phi_2 = \pi(2/8-1/2)$ |
| $\theta_9 = 2\pi 8/16$ | $\Phi_1 = \pi(1/8-1/2)$ | $\Phi_2 = \pi(2/8-1/2)$ |

If the tile covers multiple metaquads, which is true for all but the finest tiles with scale 0, then each metaquad will have corners interpolated from the spans calculated for the tile.

Figure 9A:
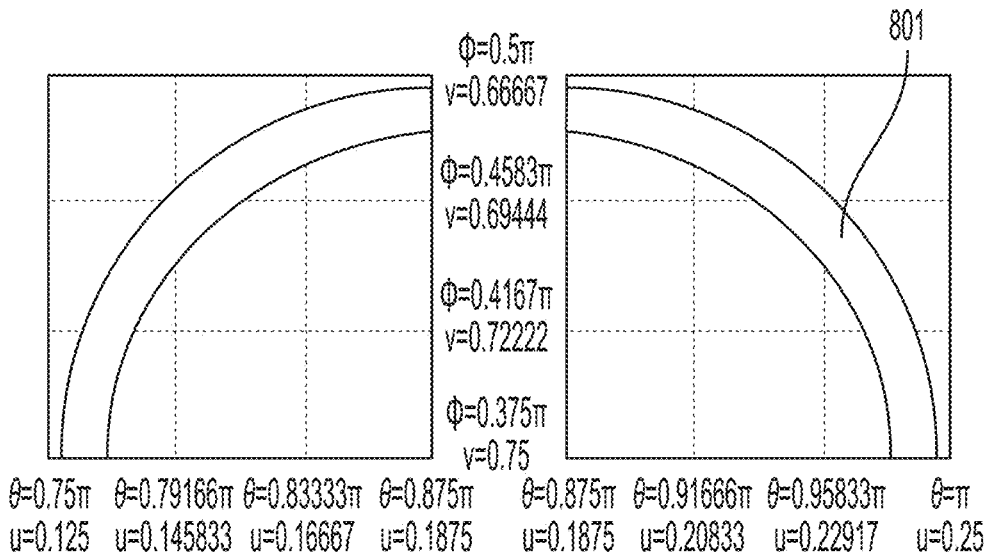
FIGS. 9a, 9b are schematic drawings illustrating a generated frame of mixed scale tiles.
Figure 9A:
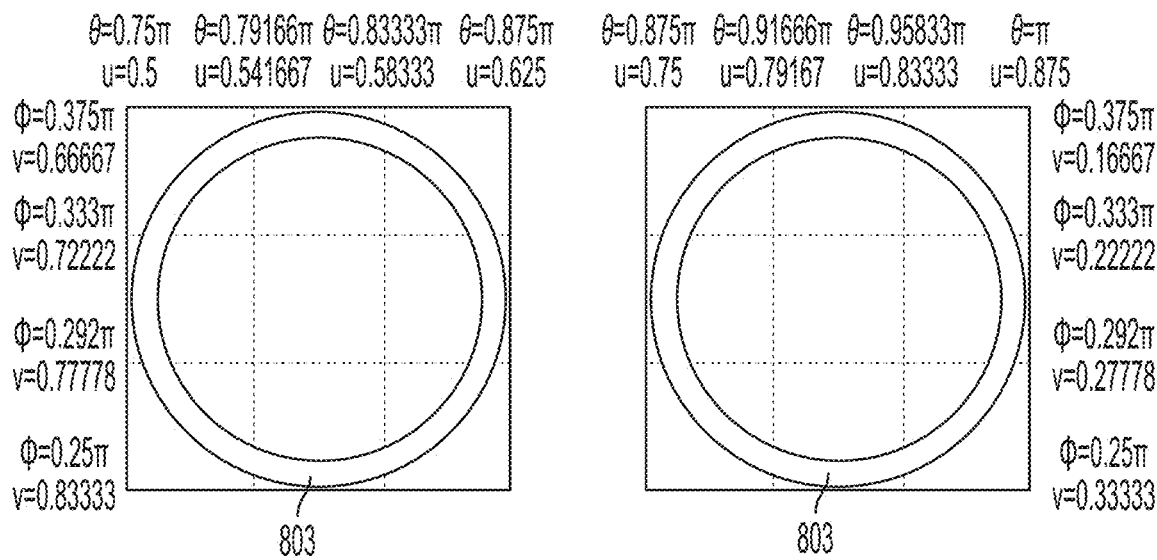
Figure 9B:
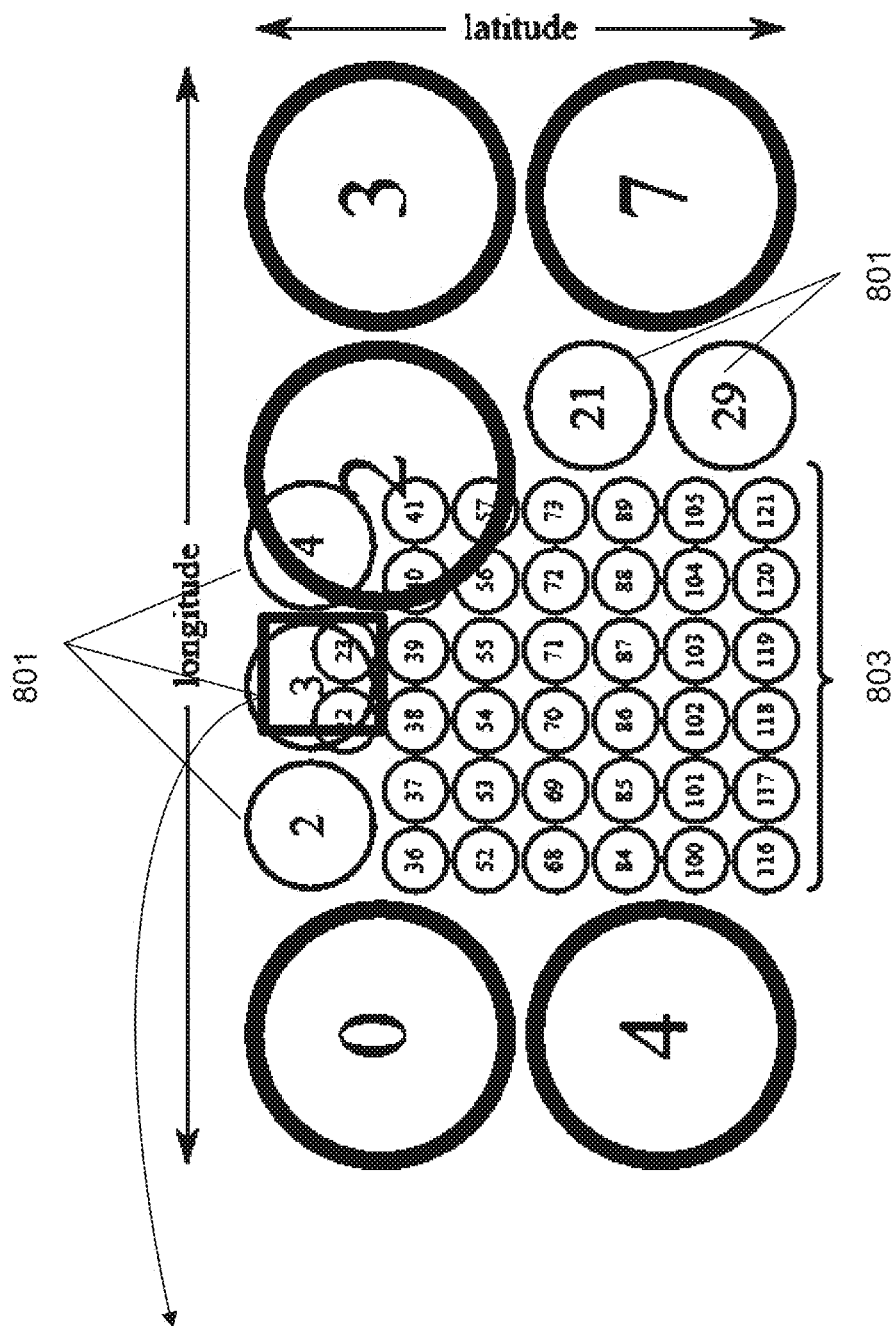

FIG. 9a and FIG. 9b are schematic drawings illustrating a generated frame from mixed scaled tiled encodings. In the case of this frame from the mixed-scale encoding, the circle with reference number 801 represents tile 3 from the medium-scale encoding, and the two circles with reference number 803 are tile 22 and 23 from the fine-scale encoding. Those tiles are not in tile slot 3, 22, and 23 in the mixed-scale encoding. The have been placed in slot 33, 36, and 14 in the mixed-scale encoding.

The arbitrary number 3×3, i.e. 9 quads in a metaquad, decomposition is a compromise between speed and image quality at the poles. Decomposing each metaquad into more quads, such as e.g. 4×4, or 5×5, reduces distortion at the poles, but increases the polygon count. Too many polygons will reduce the frame rate below the native rate of the encoded video which would be bad. It would also be possible to perform adaptive decomposition of the tiles, but extra care must be taken to make sure that the resulting geometry does not have seams.

Figure 10:
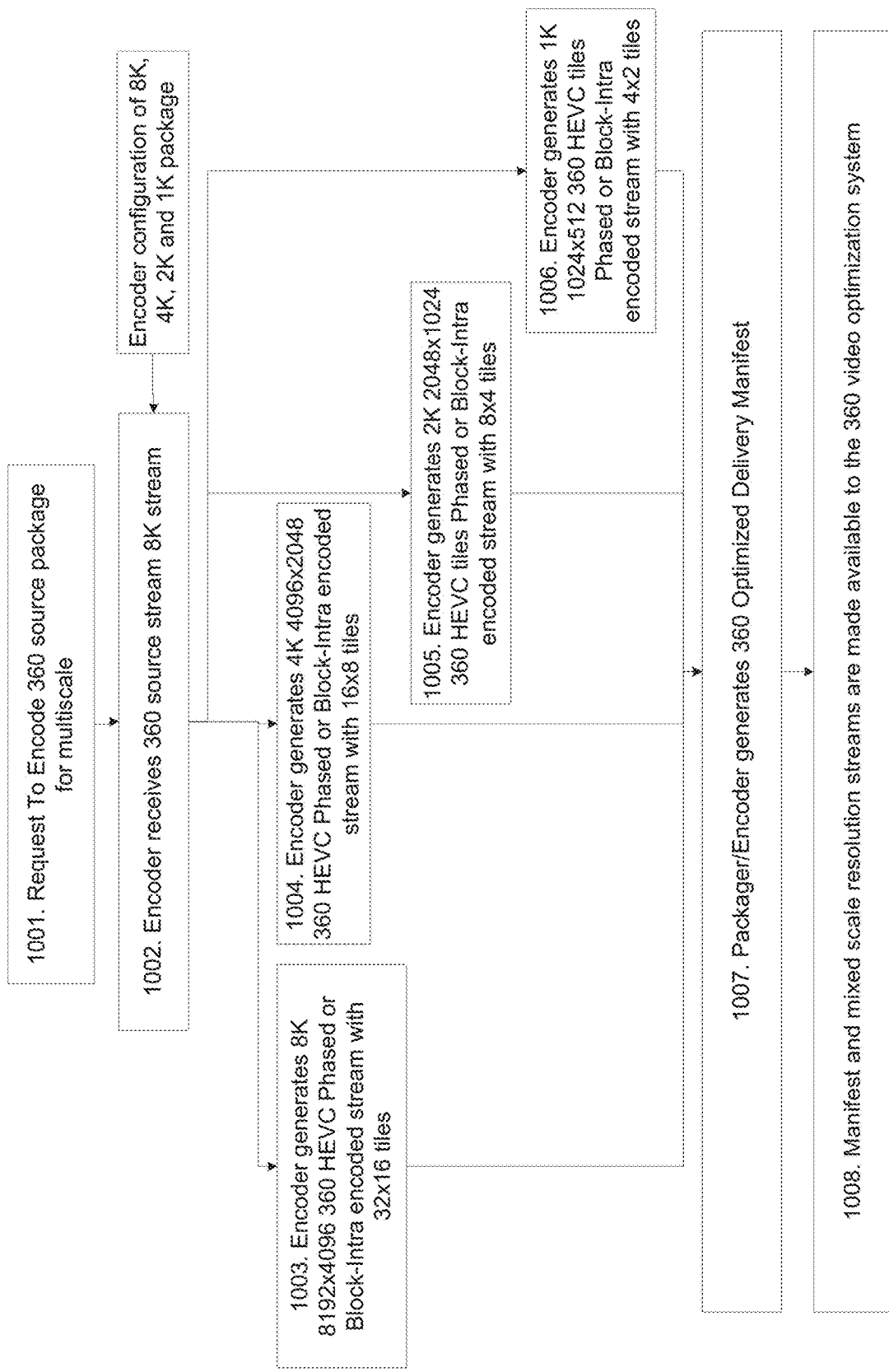
FIG. 10 is a flow chart illustrating an encoding and packaging method.

It is important to note that while θ and φ are continuous across adjacent metaquads, the u and v often are not. The v texture coordinate is continuous across the two metaquads FIG. 10 is a flow chart illustrating an encoding and packaging method for producing the mixed scale 360 degree source encodings. In the encoder configuration, the resolution (Vertical×Horizontal), tile (Columns×Rows), QP values or stream bitrate values will be input parameters. The encoder may be comprised in the server device 101. The encoding and packaging may be combined into one function or the packaging function of generating the manifest may be a separate process. The method illustrated in FIG. 10 comprises at least one of the following steps to be performed by the encoder, which steps may be performed in any suitable order than described below:

Step 1001

Request to encode 360 degree source package for multiscale.

Step 1002

The encoder receives a 360 degree source stream 8K stream. The encoder configuration of 8 k, 4 k, 2 k and 1 k package may be provided as input to step 1002.

Step 1003

The encoder generates 8 k 8192×4096 360 HEVC phased or block-intra encoded stream with 32×16 tiles.

Step 1004

The encoder generates 4 k 4096×2048 360 HEVC phased or block-intra encoded stream with 16×8 tiles.

Step 1005

The encoder generates 2 k 2048×1024 360 HEVC tiles phased or block-intra encoded stream with 8×4 tiles.

Step 1006

The encoder generates 2K 2048×1024 360 HEVC tiles phased or block-intra encoded stream with 8×4 tiles.

Step 1007

The packager/encoder generates 360 degree optimized delivery manifest.

Step 1008
The manifest and mixed scale resolution streams are made available to the 360 degree video optimization system.

Figure 11A:
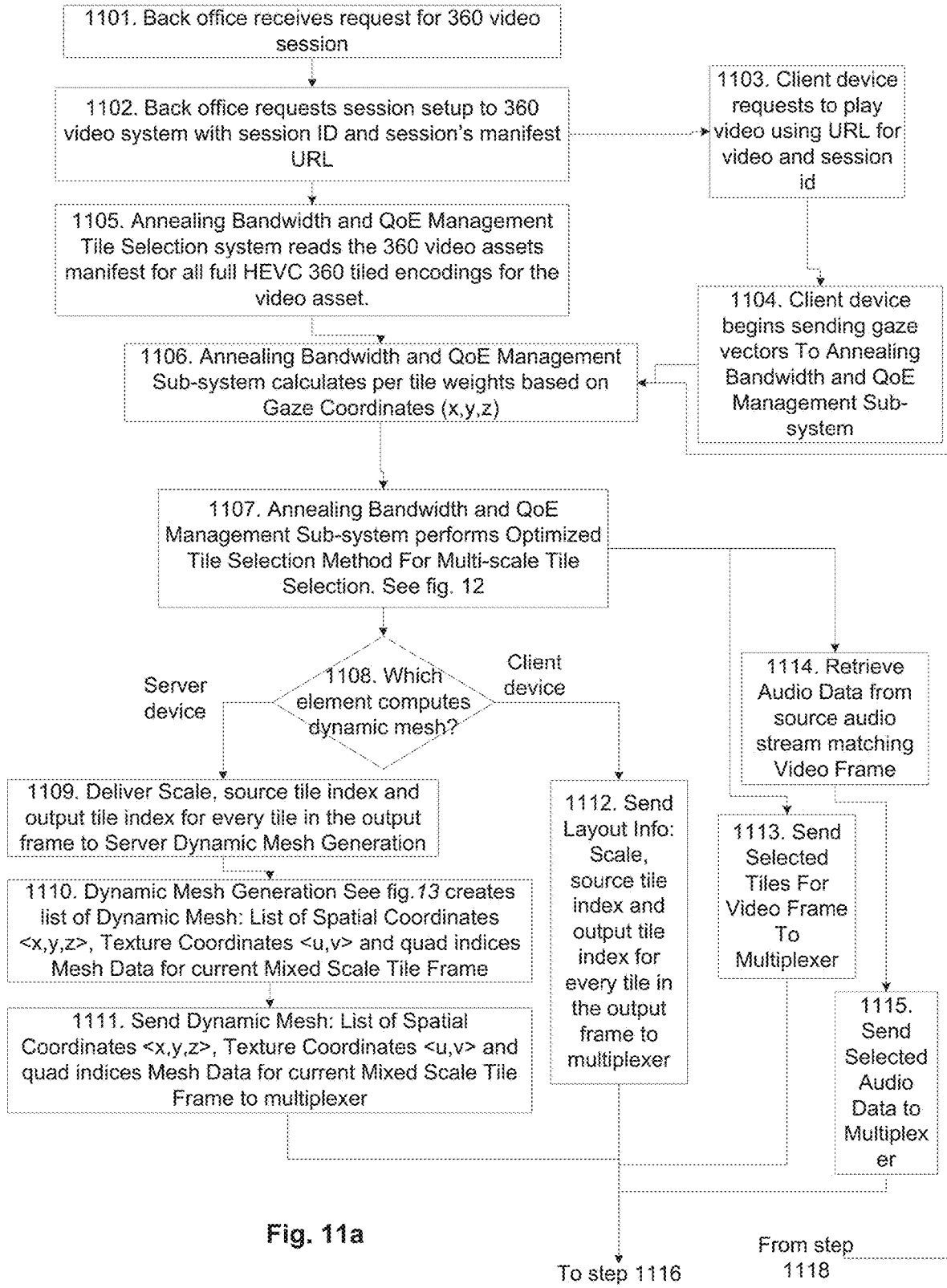
FIGS. 11a, 11b are flow charts illustrating a server device method for 360 degree multi-scale tiled video.
Figure 11B:
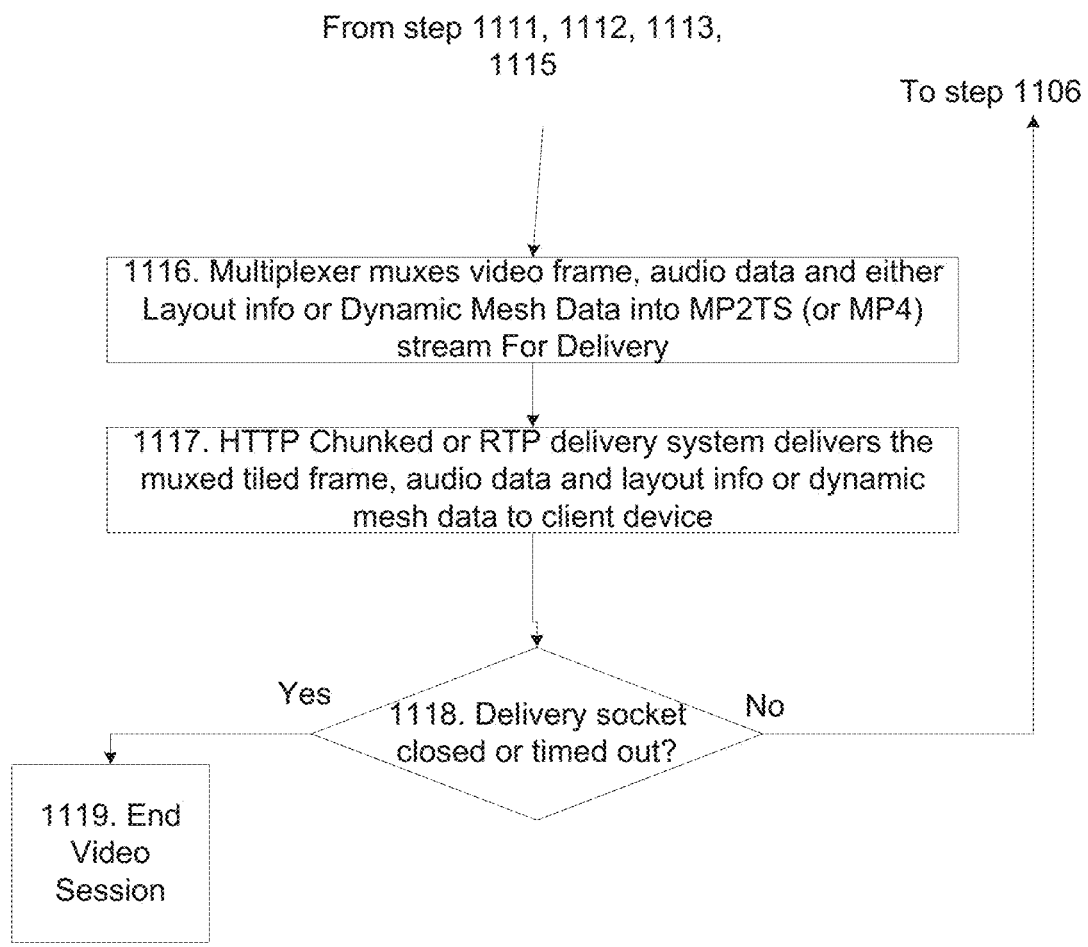

FIG. 11a and FIG. 11b are flow charts illustrating the overall process performed by the server device 101 from when the client device 103 requests a 360 degree video session to the delivery of the tiled video frame with layout information or dynamic mesh data. The details on the tile selection method which generates the layout info and dynamic mesh data are expanded FIG. 12a, FIG. 12b and FIG. 13. FIG. 11b is a continuation of FIG. 11a. The method performed by the server device 101 illustrated in FIGS. 11a and 11b0 comprise at least one of the following steps, which steps may be performed in any suitable order than described below:

Step 1101
The back office receives a request for a 360 degree video session.

Step 1102
The back office requests a session setup to a 360 degree video system with session ID and session's manifest URL.

Step 1103
The client device 103 sends a request to the server device 101 to play video using URL for video and session id.

Step 1104
The client device 103 begins sending gaze vectors the server device 101, e.g. to an annealing bandwidth and QoE management sub-system comprised in the server device 101.

Step 1105
The server device 101, e.g. the annealing bandwidth and QoE management tile selection system comprised in the server device 101, reads the 360 degree video asset's manifest for all full HEVC 360 tiled encodings for the video asset.

Step 1106
The server device 101, e.g. the annealing bandwidth and QoE management sub-system comprised in the server device 101, calculates per tile weights based on gaze coordinates (x,y,z).

Figure 12A:
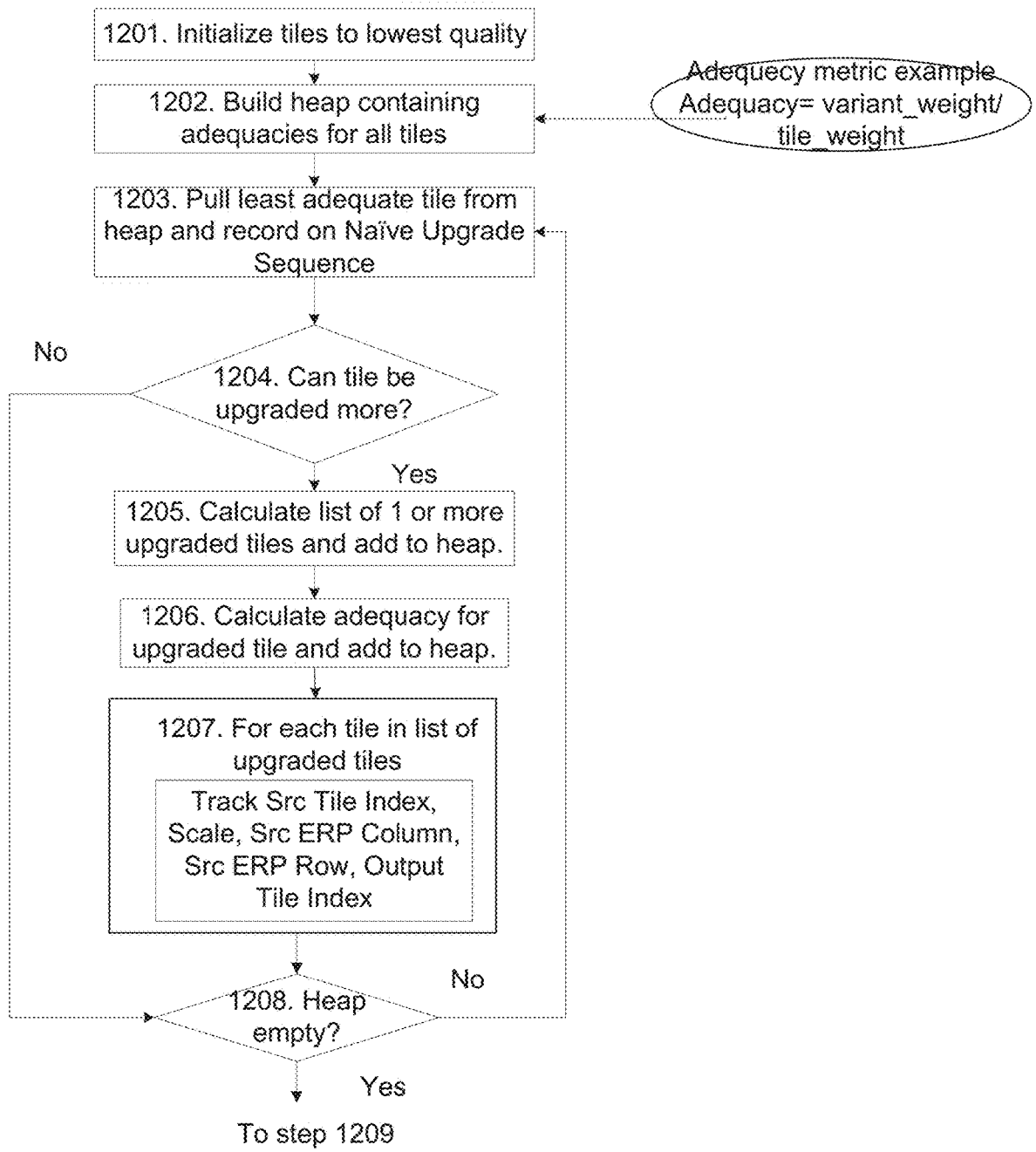
FIGS. 12a, 12b are flow charts illustrating a method for tile selection.
Figure 12B:
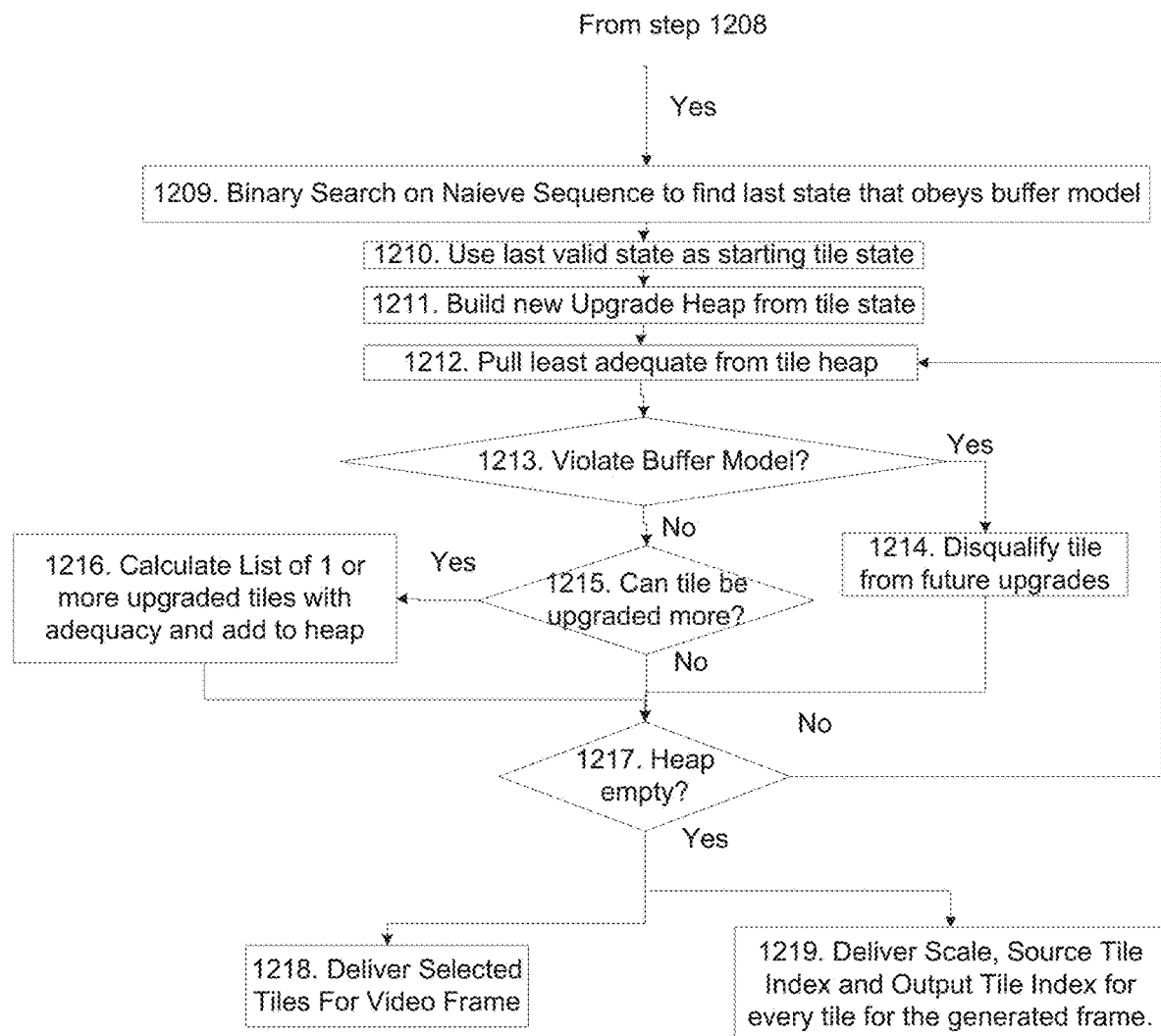

Step 1107
The server device 101, e.g. the annealing bandwidth and QoE management sub-system comprised in the server device 101, performs optimized tile selection method for multi-scale tile selection, see FIGS. 12a and 12b.

Step 1108
A decision is taken regarding which device should compute the dynamic mesh. Steps 1109-1111 are performed if the sever device 101 computes the dynamic mesh. Step 1112 is performed if the client device 103 computes the dynamic mesh.

Step 1109
This step is performed if the server device 101 should compute the dynamic mesh. The server device 101 delivers scale, source tile index and output tile index for every tile in the output frame to the server dynamic mesh generation.

Figure 13:
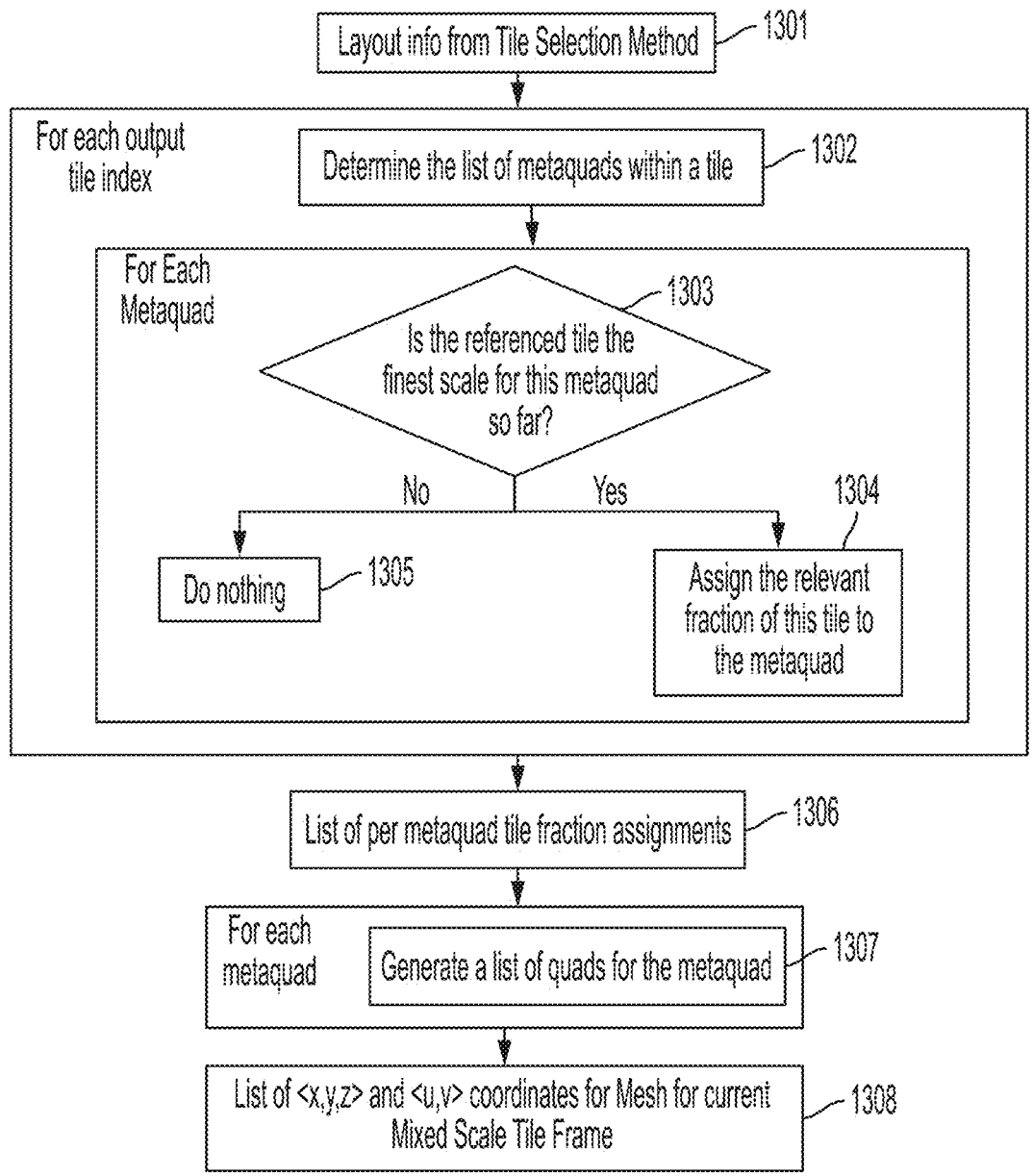
FIG. 13 is a flow chart illustrating a method for dynamic mesh generation.

Step 1110
The server device 101, e.g. the dynamic mesh generation comprised in the server device 101, see FIG. 13, creates a list of dynamic mesh: list of spatial coordinates <x,y,z>, texture coordinates <u,v> and quad indices mesh data for current mixed scale tile frame.

Step 1111
The server device 101 sends the dynamic mesh: list of spatial coordinates <x,y,z>, texture coordinates <u,v> and quad indices mesh data for current mixed scale tile frame to the multiplexer. The multiplexer may be comprised in the server device 101.

Step 1112
This step is performed if the client device 103 computes the dynamic mesh. The client device 103 sends layout info: scale, source tile index and output tile index for every tile in the output frame to the multiplexer.

Step 1113
This step may be performed after step 1107. The selected tiles for video frame are sent to the multiplexer.

Step 1114
This step may be performed after step 1107. The audio data is retrieved from source audio stream matching video frame.

Step 1115
This step may be performed after step 1114. The selected audio data is sent to the multiplexer.

Step 1116
This step may be performed after steps 1111, 1112, 1113 and 1115-1116. The multiplexer muxes video frame, audio data and either layout info or dynamic mesh data into MP2TS (or MP4) stream for delivery to the client device 103. The dynamic mesh data may be sent on a separate channel.

Step 1117
HTTP chunked or RTP delivery system 210 delivers the muxed tiled frame, audio data and layout info or dynamic mesh data to client device 103. The HTTP chunked or RTP delivery system 210 may be comprised in the server device 101.

Step 1118
It is checked whether the delivery socket is closed or has timed out. If the delivery socket is closed or has timed out, indicated with yes in FIG. 11b, then the method proceeds to step 1119. If the delivery socket is open or has not timed out, then the method proceeds to step 1106 described above.

Step 1119
This step is performed if the delivery socked is closed or has timed out, indicated with yes in FIG. 11b. The video session is ended.

FIG. 12 and FIG. 12b are flow charts illustrating the tile selection method supporting the layout information for the dynamic mesh generation in mixed scale tile rendering. FIG. 12b is a continuation of FIG. 12a. The additions are tracking a list of src tile index, scale, src ERP column, src ERP row and output tile index for each tile which happens during the tile selection process. Once the tile selection process is complete, a list of scale, source tile index and output tile index for every tile selected based on gaze and bandwidth from the annealing tile selection algorithm. ERP is short for Equirectangular Projection. The method illustrated in FIG. 12a and FIG. 12b comprises at least one of the following steps, which steps may be performed in any suitable order than described below:

Step 1201
The tiles to lowest quality are initialized.

Step 1202
The heap containing adequacies for all tiles is built. An adequecy metric example may be as follows: Adequacy=variant_weight/tile_weight.

Step 1203
The least adequate tile is pulled from heap and the naïve upgrade sequence is recorded on. Naïve upgrade sequence— is a sequence of tile upgrades where it does not matter if they perform to the buffer model however fit the adequacy matric.

Step 1204
It is checked if the tile can be upgraded more or not. If yes, the method proceeds to step 1205. If no, the method proceeds to step 1208.

Step 1205

A list of 1 or more upgraded tiles is calculated and added to the heap.

Step 1206

The adequacy for upgraded tile is calculated and added to the heap.

During the process of upgrading tile qualities to choose the layout of a mixed-scale frame sometimes the next upgrade is actually four different upgrades. This happens when upgrades happen from one scale to a different scale.

In an example of mixed-scale content, suppose the start is with 1 k-qp30. It is determined that it can be upgraded to 1 k-qp26. Next it is determined that it can be upgraded from 1 k-qp26 is 2 k-qp34. There are four 2 k tiles in the space occupied by a single 1 k tile. That means all four must be added to the upgrade heap and scored according to their variant weight and individual gaze-related weights. The subsequent upgrade process may eventually choose one of those tiles to be included in the mixed-scale frame.

A final complicating factor may be that the final tile in the bottom right of a source encoding has special markers in its syntax that tell the decoder not to look for more tiles after the final tile. This means that it can only be a final tile from one of the many variants, and that tile must be placed in the final slot of the mixed-scale encoding. If the final 2 k tile is chosen as an upgrade without removing the 1 k tile, then they would both have to be placed in the final slot (which is impossible) or one of them would have to be placed in a different slot which would cause the decoder to stop decoding after it decoded that final tile in a non-final slot and the remainder of the pixels from the remainder of the tiles would be uncomputed.

This means that either the tile splicing engine has to rewrite the final tile that is not in the final slot, or the tile upgrade process must prevent the selection of a final tile until that selection would result in the replacement of the coarser-scale final tile. This replacement is only allowed when the other three tiles have been chosen and the final tile would complete the set of four and enable the coarser scale final tile to be removed and replaced by the finer scale final tile.

Step 1207

For each tile in list of upgraded tiles, at least one of the following is determined: track src tile index, scale, src ERP column, src ERP row, output tile index.

Step 1208

In this step, it is checked if the heap is empty or not. If it is empty, then the method proceeds to step 1209. If it is not empty, then the method goes back to step 1203.

Step 1209

A binary search on naïve sequence is performed to find last state that obeys buffer model.

Step 1210

The last valid state is used as starting tile state.

Step 1211

A new Upgrade Heap is built from tile state.

Step 1212

The least adequate is pulled from the tile heap.

Step 1213

In this step it is checked if a buffer model is violated or not. If it is violated, then the method proceeds to step 1214. If it is not violated, then the method proceeds to step 1215.

Step 1214

The tile is disqualified from future upgrades.

Step 1215

It is checked if the tile can be upgraded more or not. If it can be upgraded more, then the method proceeds to step 1216. If it cannot be upgraded more, then the method proceeds to step 1217.

Step 1216

A list of 1 or more upgraded tiles with adequacy is calculated and added to the heap.

Step 1217

It is checked if the heap is empty or not. If it is empty, then the method proceeds to steps 1218 and 1219. If it is not empty, then the method goes back go step 1212.

Step 1218

Selected tiles for the video frame are delivered.

Step 1219

Scale, source tile index and output tile index for every tile for the generated frame is delivered.

FIG. 13 is a flow chart illustrating the dynamic mesh generation for the current mixed scale tiles selected for the generated frame from the method in FIG. 11a and FIG. 11b. This may be performed by the server device 101 or the client device 103. The grid of metaquads is the same as the grid of tiles in highest resolution 360 tiled encoded streams. The method illustrated in FIG. 13 comprises at least one of the following steps, which steps may be performed in any suitable order than described below:

Step 1301

Layout info from the tile selection method is provided to the next step 1302.

Step 1302

For each output tile index, the list of metaquads within a tile is determined.

Step 1303

For each metaquad, it is checked if the referenced tile is the finest scale for this metaquad so far. If it is the finest scale, then the method proceeds to step 1304. If it is not the finest scale, then the method proceeds to step 1305.

Step 1304

The relevant fraction of this tile is assigned to the metaquad.

Step 1305

Nothing is done in this step.

Step 1306

A list of per metaquad tile fraction assignments is determined.

Step 1307

For each metaquad, a list of quads for the metaquad is generated.

$c_m$, $r_m$, is the column/row address of a metaquad is computed in the first two formulas below. From FIGS. 9a and 9b, is the scale of a tile. $c_t$, $r_t$ is the column/row address of a tile in its source encoding. i and j are the address within a tile of the metaquads which make up a tile. $c_x$, $r_x$ is the column/row address of the tile in the mixed-scale encoding. $n_{cx}$, $n_{rx}$ is the number of columns and rows in the mixed-scale encoding:

$$c_m = c_t 2^s + i (i \in 0, 2^s - 1)$$

$$r_m = r_t 2^s + j (j \in 0, 2^s - 1)$$

$$\theta_c = 2\pi \frac{c}{n_c}$$

$$\phi_r = \pi\left(\frac{r}{n_r} - 1/2\right)$$

-continued $$\theta_{c,f} = \left(1 - \frac{f}{q}\right)\theta_c + \frac{f}{q}\theta_{c+1}(f \in [0, q])$$

$$\phi_{r,g} = \left(1 - \frac{g}{q}\right)\phi_r + \frac{g}{q}\phi_{r+1}(g \in [0, q])$$

$$u_f = \frac{c_x + \frac{i + f/q}{2^s}}{n_{cx}}$$

$$v_g = \frac{r_x + \frac{j + g/q}{2^s}}{n_{rx}}$$

For a metaquad c, r there are $q^2$ quads it can be decomposed into which can be each designated with a 4-tuple of the form <c, f, r, g>. The $c_x$, $r_x$, i, j, and s of the tile chosen for the metaquad may be memorized.

Step 1308

A list of <x,y,z> and <u,v> coordinates for mesh for the current mixed scale tile frame is generated.

Θ, u, Φ, v values for quads within a metaquad. See FIG. 7 for standard formulas for conversion from spherical to Cartesian coordinates.

Figure 14:
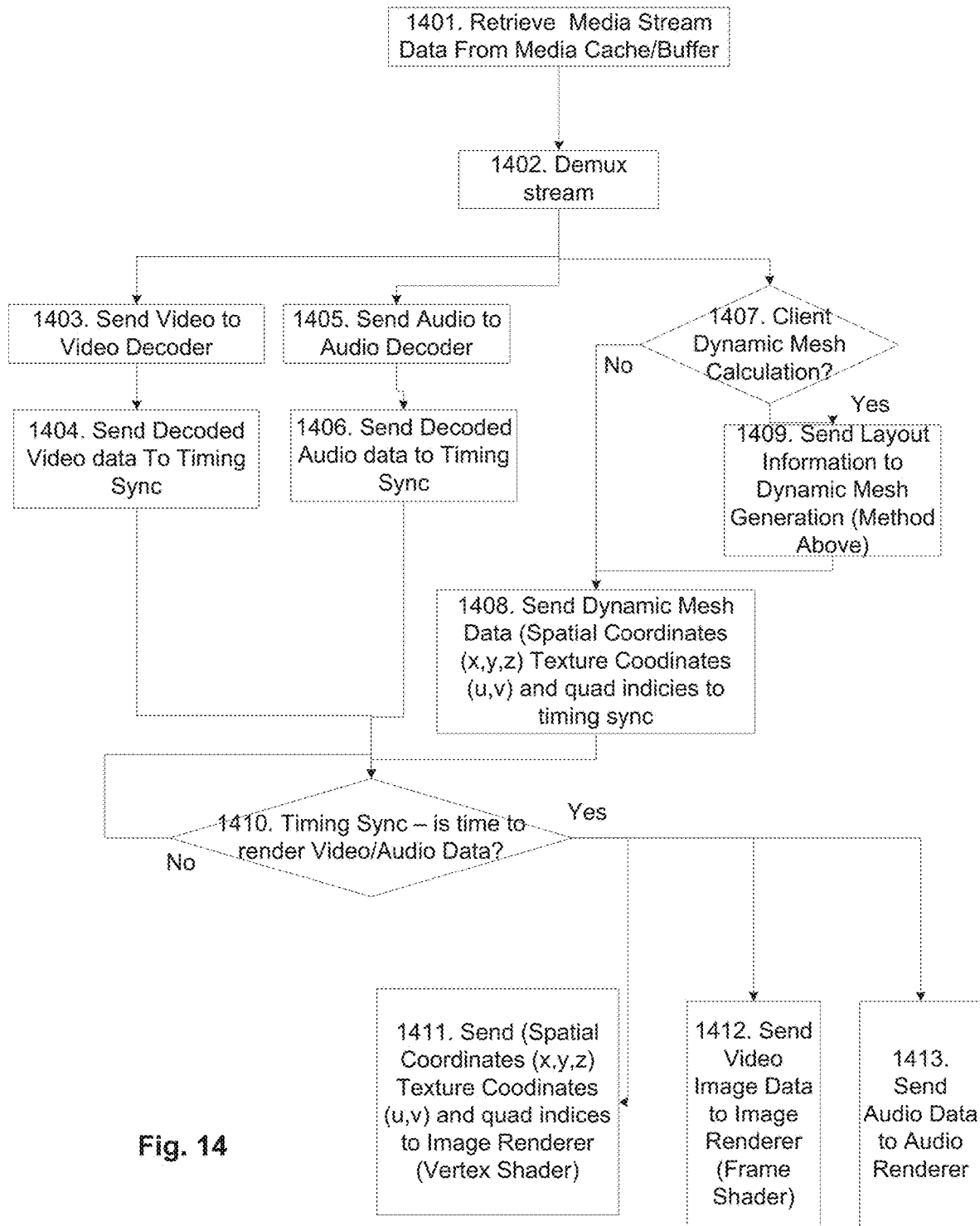
FIG. 14 is a flow chart illustrating a method performed by a client device.

FIG. 14 is a flow chart illustrating a method performed by the client device 103 for properly rendering a mixed scale tiled video frame. This method covers both the dynamic mesh generation on the server device 101 as well as the client device 103. The method in FIG. 14 comprises at least one of the following steps, which steps may be performed in any suitable order than described below:

Step 1401

The client device 103 retrieves media stream data from a media cache/buffer.

Step 1402

The client device 103 demuxes the stream.

Step 1403

The client device 103 sends the video to video decoder.

Step 1404

The client device 103 sends the decoded video data to the timing sync.

Step 1405

The audio data is sent to the audio decoder.

Step 1406

The decoded audio data is sent to the timing sync.

Step 1407

It is checked if the client device 103 performs the dynamic mesh calculation or not. If yes, then the method proceeds to step 1409. If no, then the method proceeds to step 1408.

Step 1408

The dynamic mesh data (spatial coordinates (x,y,z), texture coordinates (u,v) and quad indicies) is sent to the timing sync.

Step 1409

Layout information is sent to the dynamic mesh generation (method above).

Step 1410

Timing sync—it is checked if it is time to render video/audio data or not. If yes, then the method proceeds to step 1411, 1412 and 1413. If no, then the method performs step 1410 again.

Step 1411

The spatial coordinates (x,y,z), texture coordinates (u,v) and quad indices are sent to the image renderer, e.g. vertex shader.

Step 1412

The video image data is sent to the image renderer, e.g. a frame shader.

Step 1413

The audio data is sent to the audio renderer.

The method described above will now be described seen from the perspective of the server device 101. FIG. 15 is a flowchart describing the present method in the server device 101 for handling media data streams. The method comprises at least one of the following steps to be performed by the server device 101, which steps may be performed in any suitable order than described below:

Step 1501

This step corresponds to step 1105 in FIG. 11a. The server device 101 obtains multiple streams of source media data of varying resolution each having multiple source frames. Each source frame is divided into a plurality of tiles. The source media data may be obtained from e.g. the data capturing device 105 directly or via some memory unit. The term multiple refers to two or more, a plurality or n number, where n is a positive integer larger than one.

The multiple streams of source media data may comprise at least one of live TV content, IPTV content, time-shifted (TS) TV content, place-shifted (PS) TV content, gaming content, Video on Demand (VOD) content, adaptive multi-bitrate (MBR) content, VR content, Augmented Reality (AR) content, Mixed Reality (MR) content, and networked Digital Video Recorder (nDVR) content.

Step 1502

This step corresponds to step 1107 in FIG. 1. The server device 101 selects a subset of tiles from least one of the streams of source media data. The selected subset of tiles is comprised in an output frame. A frame comprises multiple tiles.

The selected subset of tiles in the output frame may vary in scale and resolution.

The selection of the subset of tiles may be based on user gaze information and allocated bandwidth.

The subset of tiles comprises a plurality of tiles, where plurality refers to two or more, multiple or n tiles, where n is a positive integer larger than one.

See FIG. 12a and FIG. 12b for more details regarding the selectin of the subset of tiles.

Step 1503

This step corresponds to step 1109 in FIG. 11a. The server device 101 determines layout information for the selected subset of tiles in the output frame. The layout information comprises scale, source tile index and output tile index.

Step 1504

This step corresponds to step 1110 in FIG. 11a. The server device 101 may generate dynamic mesh data based on the layout information and for the selected subset of tiles in the output frame.

The dynamic mesh data may comprise a list of spatial coordinates, texture coordinates and quad indices mesh data for the selected subset of tiles in the output frame.

The generation of the dynamic mesh data may be based on quads and metaquads.

The dynamic mesh data may be provided to the client device 103 in the form of SEI data for MP2TS containers or MP4, box data for MP4 containers, or delivered on a separate channel with included timing information.

The dynamic mesh data may indicate rendering of the media data, e.g. the source media data.

The mesh data changes based on the tile selection as a result of a user changing gaze, a reduction in bandwidth or in the case of a target QP encoding vs CBR encoding, a drastic change in tile bitrate as a result in drastic changes in the different from one frame to the next (i.e. high motion video). Each of these will result in a new selection of tiles causing changes in scale of the tiles making up the picture. This will require a new mesh to be generated hence dynamic.

Step 1505

This step corresponds to step 301 in FIG. 3 and step 1111 in FIG. 11a. The server device 101 may provide the dynamic mesh data to a client device 103.

Step 1506

This step corresponds to step 1112 in FIG. 11a. The server device 101 may provide the layout information to a client device 103.

A computer program may comprise instructions which, when executed on at least one processor, cause the at least one processor to carry out the method steps 1501-1506. A carrier may comprise the computer program, and the carrier is one of an electronic signal, optical signal, radio signal or computer readable storage medium.

The method described above will now be described seen from the perspective of the client device 103. FIG. 16 is a flowchart describing the present method in the client device 103 for handling media data streams. The method comprises at least one of the following steps to be performed by the client device 103, which steps may be performed in any suitable order than described below:

Step 1601

This step corresponds to step 401 in FIG. 4 and step 1112 in FIG. 11a. The client device 103 may obtain, from a server device 101, layout information for a selected subset of tiles in an output frame. The layout information may comprise scale, source tile index and output tile index.

Step 1602

This step corresponds to step 301 in FIG. 3 and step 401 in FIG. 4. The client device 103 obtains dynamic mesh data for a selected subset of tiles for an output frame.

The dynamic mesh data may be obtained from the server device 101.

The dynamic mesh data may comprise a list of spatial coordinates, texture coordinates and quad indices mesh data for the selected subset of tiles in the output frame.

Selected subset of tiles in the output frame may vary in size and resolution.

The dynamic mesh data may be in the form of SEI data for MP2TS containers or MP4 box data for MP4 containers, or delivered on a side channel.

Step 1602a

This step corresponds to step 403 in FIG. 4. This step may be seen as a substep of step 1602. The client device 103 may obtain the dynamic mesh data by generating the dynamic mesh data based on the layout information.

The generation of the dynamic mesh data may be based on quads and metaquads.

Step 1603

The client device 103 renders multiple streams of source media data of varying resolution and scale based on the dynamic mesh data.

The multiple streams of source media data may comprise at least one of live TV content, IPTV content, TS TV content, PS TV content, gaming content, VOD content, adaptive MBR content, VR content, AR content, MR content, and nDVR content.

A computer program may comprise instructions which, when executed on at least one processor, cause the at least one processor to carry out the method steps 1601-1603. A carrier may comprise the computer program, and the carrier is one of an electronic signal, optical signal, radio signal or computer readable storage medium.

Figure 17A:
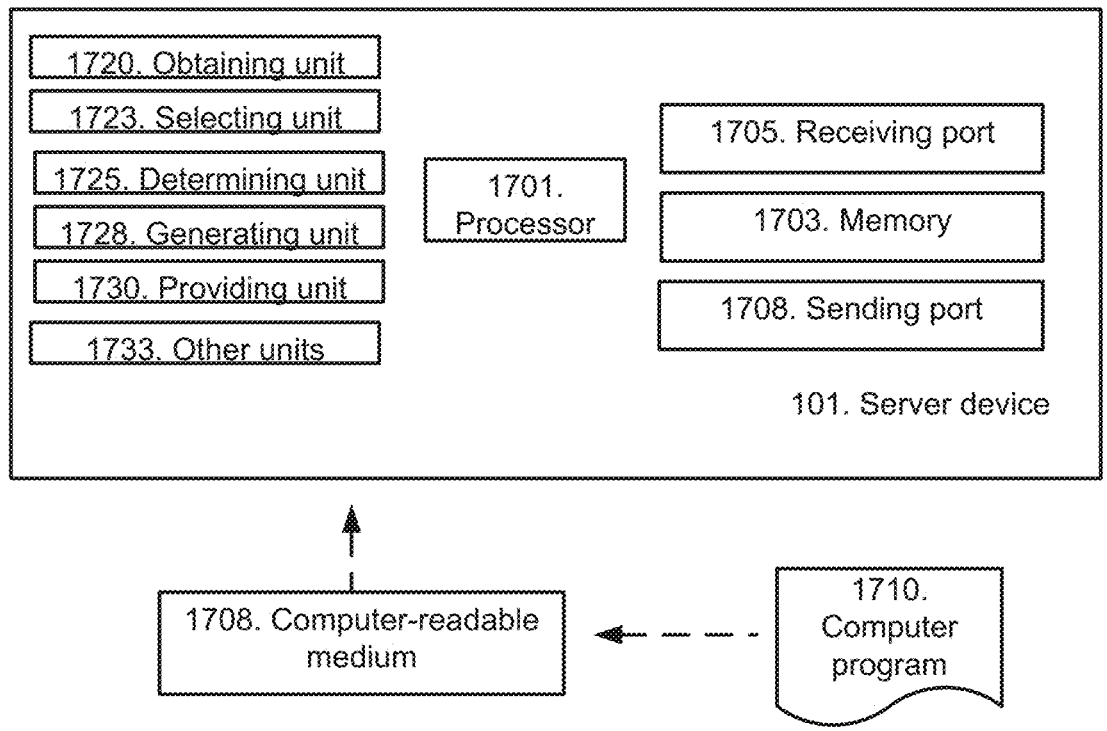
FIG. 17a-b are schematic block diagrams illustrating a server device.
Figure 17B:
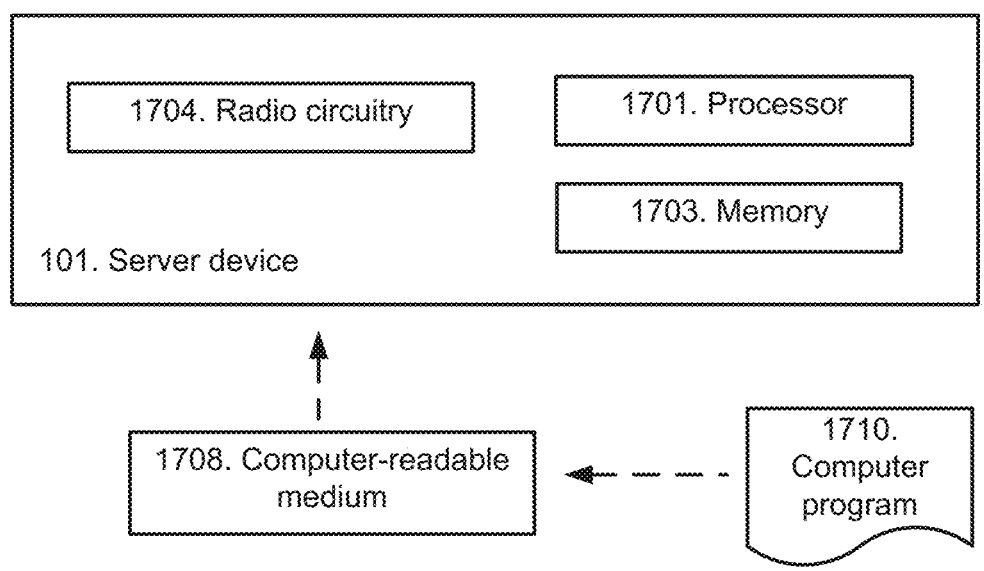

FIG. 17a and FIG. 17b depict two different examples in panels a) and b), respectively, of the arrangement that the server device 101 may comprise. The server device 101 may comprise the following arrangement depicted in FIG. 17a.

The server device 101 may be implemented through one or more processors, such as a processor 1701 in the server device 101 depicted in FIG. 17a, together with computer program code for performing the functions and actions of the embodiments herein. A processor may be understood to be a hardware component. The program code mentioned above may also be provided as a computer program product, for instance in the form of a data carrier carrying computer program code for performing the methods described herein when being loaded into the server device 101. One such carrier may be in the form of a CD ROM disc. It is however feasible with other data carriers such as a memory stick. The computer program code may furthermore be provided as pure program code on a server and downloaded to the server device 101.

The server device 101 may further comprise a memory 1703 comprising one or more memory units. The memory 1703 is arranged to be used to store obtained information, store data, configurations, schedulings, and applications etc. to perform the methods herein when being executed in the server device 101.

The server device 101 may receive information from, e.g., the client device 103, through a receiving port 1705. The receiving port 1705 may be, for example, connected to one or more antennas in server device 101. The server device 101 may receive information from another structure in the communications system 100 through the receiving port 1705. Since the receiving port 1705 may be in communication with the processor 1701, the receiving port 1705 may then send the received information to the processor 1701. The receiving port 1705 may also be configured to receive other information.

The processor 1701 in the server device 101 may be further configured to transmit or send information to e.g. client device 103, or another structure in the communications system 100, through a sending port 1708, which may be in communication with the processor 1701, and the memory 1703.

The server device 101 may comprise an obtaining unit 1720, a selecting unit 1723, a determining unit 1725, a generating unit 1728, a providing unit 1730, and other units 1733.

Those skilled in the art will also appreciate that the obtaining unit 1720, the selecting unit 1723, the determining unit 1725, the generating unit 1728, the providing unit 1730 and the other units described above may refer to a combination of analog and digital circuits, and/or one or more processors configured with software and/or firmware, e.g., stored in memory, that, when executed by the one or more processors such as the processor 1701, perform as described above. One or more of these processors, as well as the other digital hardware, may be included in a single ASIC, or several processors and various digital hardware may be distributed among several separate components, whether individually packaged or assembled into a System-on-a-Chip (SoC).

The different units 1720-1733 described above may be implemented as one or more applications running on one or more processors such as the processor 1701.

The methods described herein for the server device 101 may be respectively implemented by means of a computer program 1710 product, comprising instructions, i.e., software code portions, which, when executed on at least one processor 1701, cause the at least one processor 1701 to carry out the actions described herein, as performed by the server device 101. The computer program 1710 product may be stored on a computer-readable storage medium 1708. The computer-readable storage medium 1708, having stored thereon the computer program 1710, may comprise instructions which, when executed on at least one processor 1701, cause the at least one processor 1701 to carry out the actions described herein, as performed by the server device 101. The computer-readable storage medium 1708 may be a non-transitory computer-readable storage medium, such as a CD ROM disc, or a memory stick. The computer program 1710 product may be stored on a carrier containing the computer program 1710 just described, wherein the carrier is one of an electronic signal, optical signal, radio signal, or the computer-readable storage medium 1708, as described above.

The server device 101 may comprise a communication interface configured to facilitate communications between the server device 101 and other nodes or devices, e.g., the client device 103, or another structure. The interface may, for example, include a transceiver configured to transmit and receive radio signals over an air interface in accordance with a suitable standard.

The server device 101 may comprise the following arrangement depicted in FIG. 17*b*. The server device 101 may comprise a processing circuitry 1701, e.g., one or more processors such as the processor 1701, in the server device 101 and the memory 1703. The server device 101 may also comprise a radio circuitry 1704, which may comprise e.g., the receiving port 1705 and the sending port 1708. The processing circuitry 1701 may be configured to, or operable to, perform the method actions according to FIG. 15 in a similar manner as that described in relation to FIG. 17*a*. The radio circuitry 1704 may be configured to set up and maintain at least a wireless connection with the server device 101. Circuitry may be understood herein as a hardware component.

The server device 101 may be operative to operate in the communications system 100. The server device 101 may comprise the processing circuitry 1701 and the memory 1703. The memory 1703 comprises instructions executable by said processing circuitry 1701. The server device 101 is further operative to perform the actions described herein in relation to the server device 101, e.g. in FIG. 2-15.

Figure 18A:
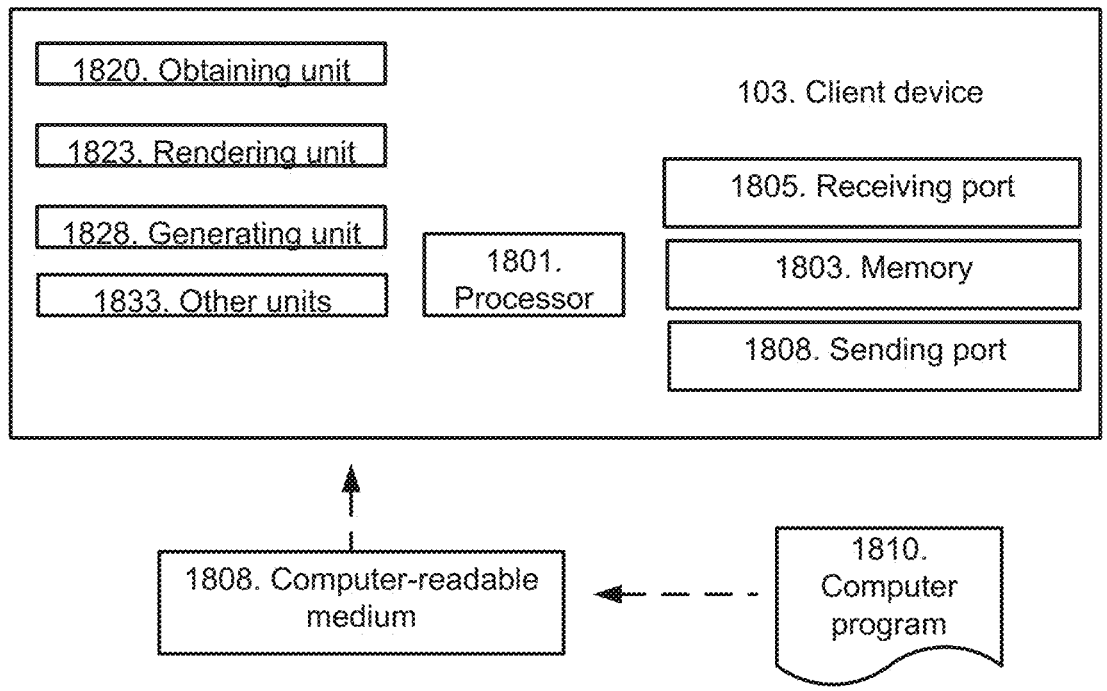
FIG. 18a-b are schematic block diagrams illustrating a client device.
Figure 18B:
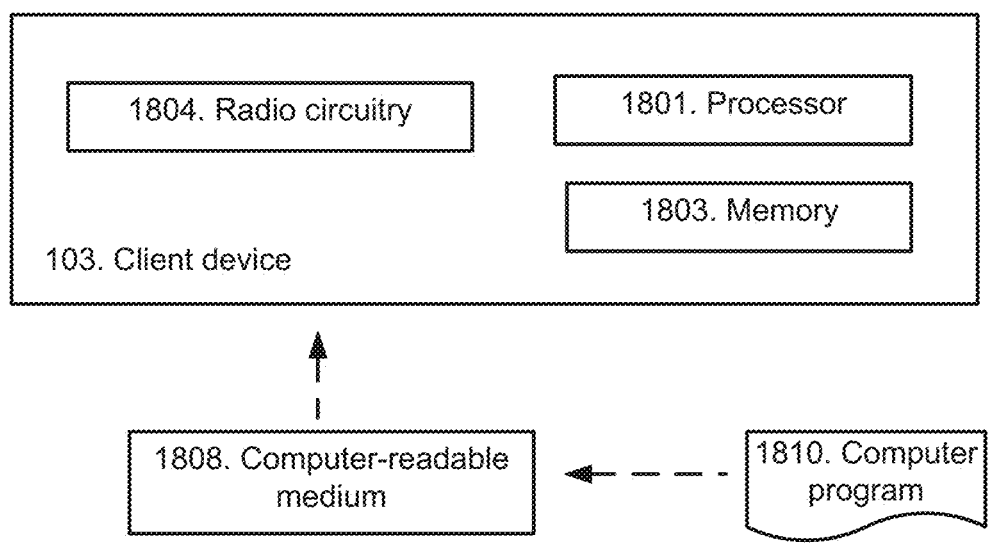

FIG. 18*a* and FIG. 18*b* depict two different examples in panels a) and b), respectively, of the arrangement that the client device 103 may comprise. The client device 103 may comprise the following arrangement depicted in FIG. 18*a*.

The client device 103 may be implemented through one or more processors, such as a processor 1801 in the client device 103 depicted in FIG. 18*a*, together with computer program code for performing the functions and actions of the embodiments described herein. A processor may be understood to be a hardware component. The program code mentioned above may also be provided as a computer program product, for instance in the form of a data carrier carrying computer program code for performing the embodiments herein when being loaded into the server device 101. One such carrier may be in the form of a CD ROM disc. It is however feasible with other data carriers such as a memory stick. The computer program code may furthermore be provided as pure program code on a server and downloaded to the client device 103.

The client device 103 may further comprise a memory 1803 comprising one or more memory units. The memory 1803 is arranged to be used to store obtained information, store data, configurations, schedulings, and applications etc. to perform the methods herein when being executed in the client device 103.

The client device 103 may receive information from, e.g., the server device 101, through a receiving port 1805. The receiving port 1805 may be, for example, connected to one or more antennas in server device 101. The client device 103 may receive information from another structure in the communications system 100 through the receiving port 1805. Since the receiving port 1805 may be in communication with the processor 1801, the receiving port 1805 may then send the received information to the processor 1801. The receiving port 1805 may also be configured to receive other information.

The processor 1801 in the client device 103 may be further configured to transmit or send information to e.g. server device 101, or another structure in the communications system 100, through a sending port 1808, which may be in communication with the processor 1801, and the memory 1803.

The client device 103 may comprise an obtaining unit 1820, a rendering unit 1823, a generating unit 1828, and other units 1833.

Those skilled in the art will also appreciate that the obtaining unit 1820, the rendering unit 1823, the generating unit 1828 and the other units 1833 described above may refer to a combination of analog and digital circuits, and/or one or more processors configured with software and/or firmware, e.g., stored in memory, that, when executed by the one or more processors such as the processor 1801, perform as described above. One or more of these processors, as well as the other digital hardware, may be included in a single ASIC, or several processors and various digital hardware may be distributed among several separate components, whether individually packaged or assembled into a SoC.

The different units 1820-1833 described above may be implemented as one or more applications running on one or more processors such as the processor 1801.

The methods described herein for the client device 103 may be respectively implemented by means of a computer program 1810 product, comprising instructions, i.e., software code portions, which, when executed on at least one processor 1801, cause the at least one processor 1801 to carry out the actions described herein, as performed by the client device 103. The computer program 1810 product may be stored on a computer-readable storage medium 1808. The computer-readable storage medium 1808, having stored thereon the computer program 1810, may comprise instructions which, when executed on at least one processor 1801, cause the at least one processor 1801 to carry out the actions described herein, as performed by the client device 103. The computer-readable storage medium 1808 may be a non-transitory computer-readable storage medium, such as a CD ROM disc, or a memory stick. The computer program 1810 product may be stored on a carrier containing the computer program 1810 just described, wherein the carrier is one of an electronic signal, optical signal, radio signal, or the computer-readable storage medium 1808, as described above.

The client device 103 may comprise a communication interface configured to facilitate communications between the client device 103 and other nodes or devices, e.g., the server device 101, or another structure. The interface may, for example, include a transceiver configured to transmit and receive radio signals over an air interface in accordance with a suitable standard.

The client device 103 may comprise the following arrangement depicted in FIG. 18*b*. The client device 103 may comprise a processing circuitry 1801, e.g., one or more processors such as the processor 1801, in the client device 103 and the memory 1803. The client device 103 may also comprise a radio circuitry 1804, which may comprise e.g., the receiving port 1805 and the sending port 1808. The processing circuitry 1801 may be configured to, or operable to, perform the method actions according to FIG. 16 in a similar manner as that described in relation to FIG. 18a. The radio circuitry 1804 may be configured to set up and maintain at least a wireless connection with the server device 101. Circuitry may be understood herein as a hardware component.

The client device 103 may be operative to operate in the communications system 100. The client device 103 may comprise the processing circuitry 1801 and the memory 1803. The memory 1803 comprises instructions executable by said processing circuitry 1801. The client device 103 is further operative to perform the actions described herein in relation to the server device 101, e.g. in FIGS. 2-14 and 16.

The embodiments herein allows for many full 360 degree mixed resolution tiled HEVC encoded streams to be the input of the annealing bandwidth and QoE management tile selection system comprised in the server device 101. As the resolution of these streams decrease, the bandwidth decreases as well. Based on the user's gaze and bandwidth allocated, the annealing bandwidth and QoE management tile selection system comprised in the sever device 101 will select the tiles from the higher/highest resolution/bitrate stream will be in the direct line of sight while decreasing bit sizes of tiles which may be from lower resolution 360 degree streams resulting in mix scale (resolution) tiles throughout the peripheral vision areas down to the lowest bitrate/resolution tiles 180 degrees from the direct line of sight. For the client device 103 to properly render the mixture of scales, the annealing bandwidth and QoE management tile selection system comprised in the server device 101 will output dynamic mesh data for each mixed scale frame. This data will be fed into the HEVC tile combining and stream generation system also comprised in the server device 101 on a frame by frame basis. The dynamic mesh data will be muxed into the stream as either SEI or MP4 boxes with the audio and video to be delivered to the client device 103. The client device 103 will receive this data and use it to properly render the mixed scale frames.

The embodiments herein provide enhancements for 360 degree viewing QoE allowing for optimal decoder/image processing and bandwidth management is made through generating 360 video frames made up of mixed scale resolution 360 degree HEVC encoded tiles from varying resolution source streams.

The embodiments herein relate to server controlled rendering of mixed scale 360 degree video.

The embodiments herein may apply to a mixed-scale cubemap.

The embodiments herein relate to virtual reality headset, 360 degree video, HEVC tiled mixed scale tile encoding, field of vision, mixed scale tile encoding, mixed scale tile assembly, mixed scale tile rendering and dynamic mesh generation and delivery.

The embodiments herein relates to 360 degree video using bandwidth, gaze and encoded bitrate to construct each and every frame from a set of multiple bitrate/mixed scale source encodings.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a server device for handling media data streams, the method comprising:
    obtaining multiple streams of source media data of varying resolution each having multiple source frames, wherein each source frame is divided into a plurality of tiles;
    selecting a subset of tiles from at least two of the multiple streams of source media data, wherein the selected subset of tiles is comprised in an output frame, wherein the selected subset of tiles varies in scale and resolution, wherein selecting the subset of tiles is based on user gaze information and allocated bandwidth; and
    determining layout information for the selected subset of tiles in the output frame, wherein the layout information comprises scale, source tile index and output tile index.

2. The method according to claim 1, comprising:
    generating dynamic mesh data based on the layout information and for the selected subset of tiles in the output frame; and
    providing the dynamic mesh data to a client device.

3. The method according to claim 1, comprising:
    providing the layout information to a client device.

4. The method according to claim 2, wherein the dynamic mesh data comprises a list of spatial coordinates, texture coordinates and quad indices mesh data for the selected subset of tiles in the output frame.

5. The method according to claim 2, wherein the generation of the dynamic mesh data is based on quads and metaquads.

6. A server device for handling media data streams, the server device being adapted to perform operations comprising:
    obtaining multiple streams of source media data of varying resolution each having multiple source frames, wherein each source frame is divided into a plurality of tiles;
    selecting a subset of tiles from at least two of the multiple streams of source media data, wherein the selected subset of tiles is comprised in an output frame, wherein the selected subset of tiles varies in scale and resolution, wherein selecting the subset of tiles is based on user gaze information and allocated bandwidth; and determining layout information for the selected subset of tiles in the output frame, wherein the layout information comprises scale, source tile index and output tile index.

7. A computer program comprising a non-transitory computer readable medium storing instructions which, when executed on at least one processor, cause the at least one processor to carry out the method according to claim 1.

* * * * *